United States Patent [19]

Shimizu

[11] Patent Number: 5,636,067
[45] Date of Patent: Jun. 3, 1997

[54] TAKING LENS SYSTEM

[75] Inventor: Seiji Shimizu, Hachioji, Japan

[73] Assignee: Olympus Optical Co., Ltd., Tokyo, Japan

[21] Appl. No.: 193,855

[22] Filed: Feb. 9, 1994

[30] Foreign Application Priority Data

Feb. 9, 1993 [JP] Japan .................................. 5-021207

[51] Int. Cl.$^6$ ........................... G02B 9/34; G02B 13/18; G02B 13/04; G02B 9/60
[52] U.S. Cl. ................ 359/774; 359/714; 359/715; 359/716; 359/753; 359/764; 359/766
[58] Field of Search .......................... 359/774, 692, 359/773, 691, 784, 792, 714, 715, 716, 753, 766, 764; 354/187; 396/341, 348

[56] References Cited

U.S. PATENT DOCUMENTS 4,240,705 12/1980 Fujibayashi .
4,359,270 11/1982 Okudaira .................. 359/687

FOREIGN PATENT DOCUMENTS

| | | |
|---|---|---|
| 55-105216 | 8/1980 | Japan . |
| 56-42847 | 10/1981 | Japan . |
| 60-48010A | 3/1985 | Japan .................. 359/774 |
| 4-43245 | 7/1992 | Japan . |
| 405281470 | 10/1993 | Japan . |

*Primary Examiner*—Scott J. Sugarman
*Attorney, Agent, or Firm*—Cushman, Darby & Cushman IP Group of Pillsbury Madison & Sutro LLP

[57] ABSTRACT

A high-performance taking lens system suitable for a lens shutter type camera, which is capable of displaying superior optical performance as far as the edges of film image field with minimal deterioration of the performance despite a simple arrangement. The taking lens system has a front lens unit including at least one positive lens (G1) and at least one negative lens (G2) whose image-side surface has a higher curvature than that of the object-side surface thereof, and a rear lens unit disposed behind the front lens unit and including a doublet (G3) which consists of one positive lens and one negative lens and which has a positive refractive power, and a positive lens (G4). The lens surface of the doublet (G3) that is the closest to the image side is concave toward the image side. The intermediate lens surface of the doublet (G3) is convex toward the image side. The negative lens (G2) is preferably a meniscus negative lens having a concave surface directed toward the image side. Focusing from the infinite object point to a near object point is preferably effected by moving the two lens units together as one unit toward the object side while varying the air spacing therebetween.

31 Claims, 27 Drawing Sheets

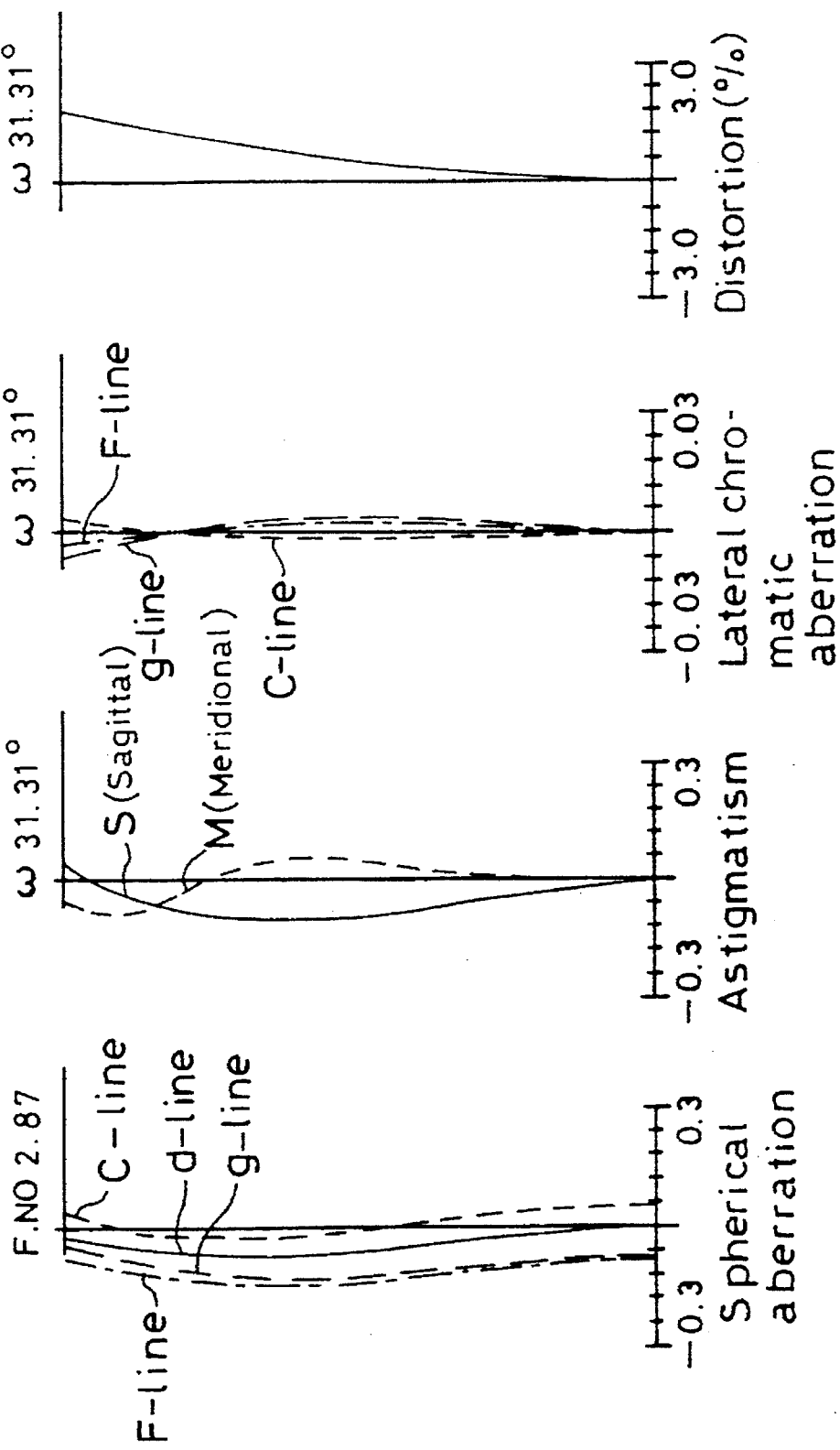

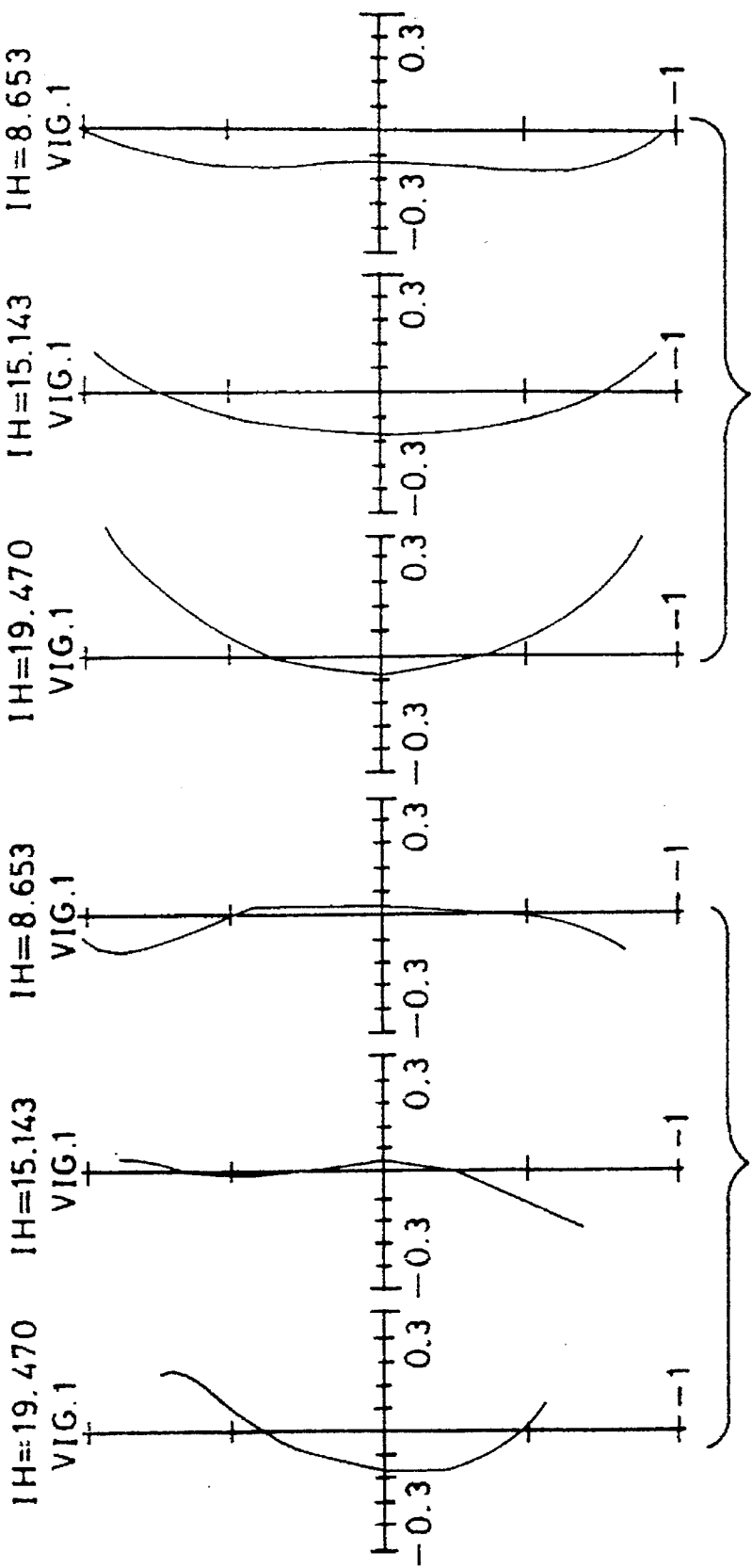

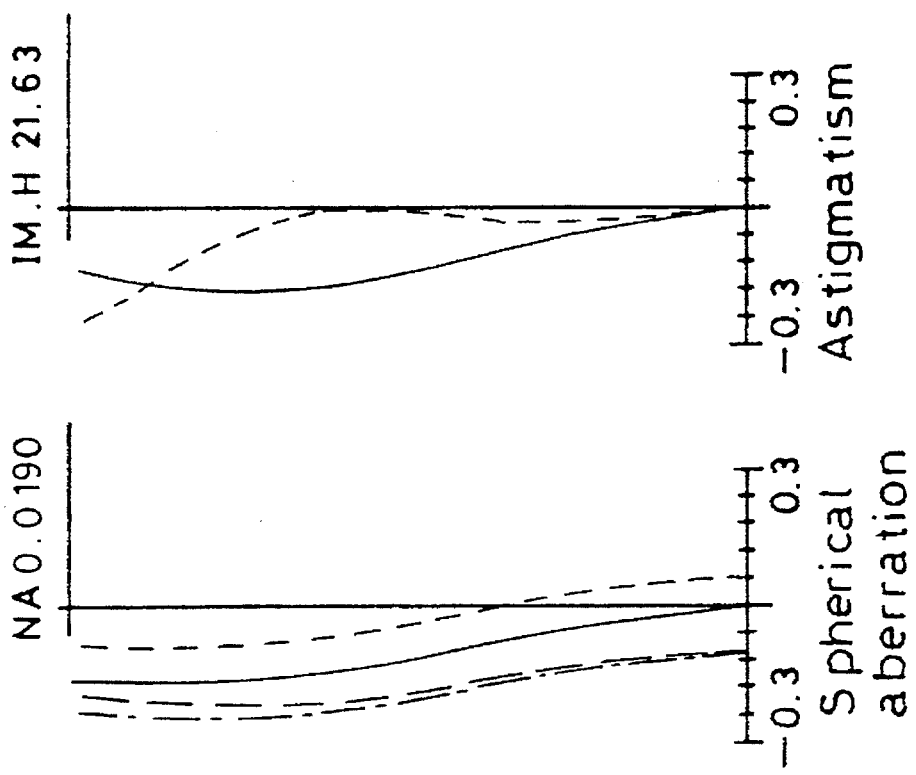

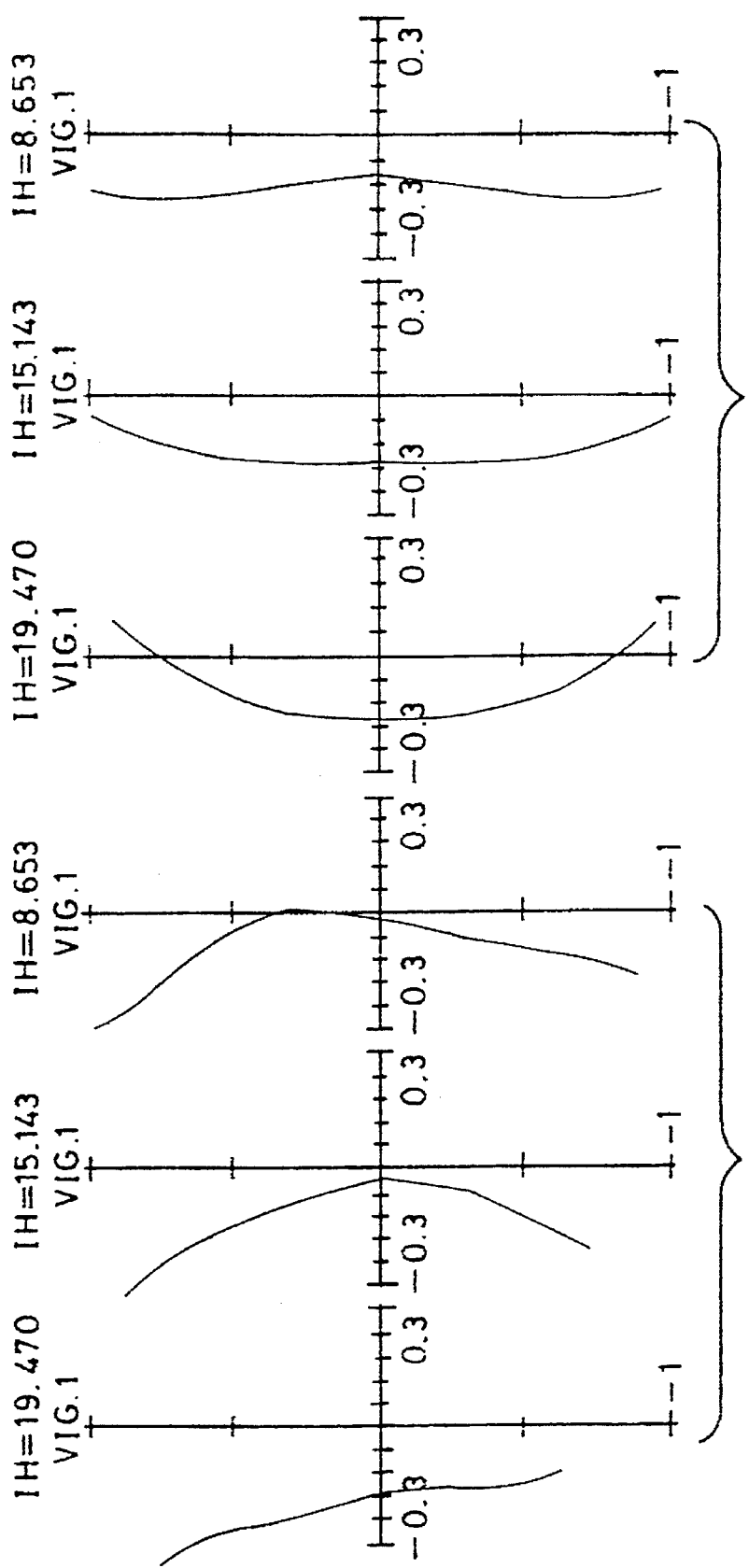

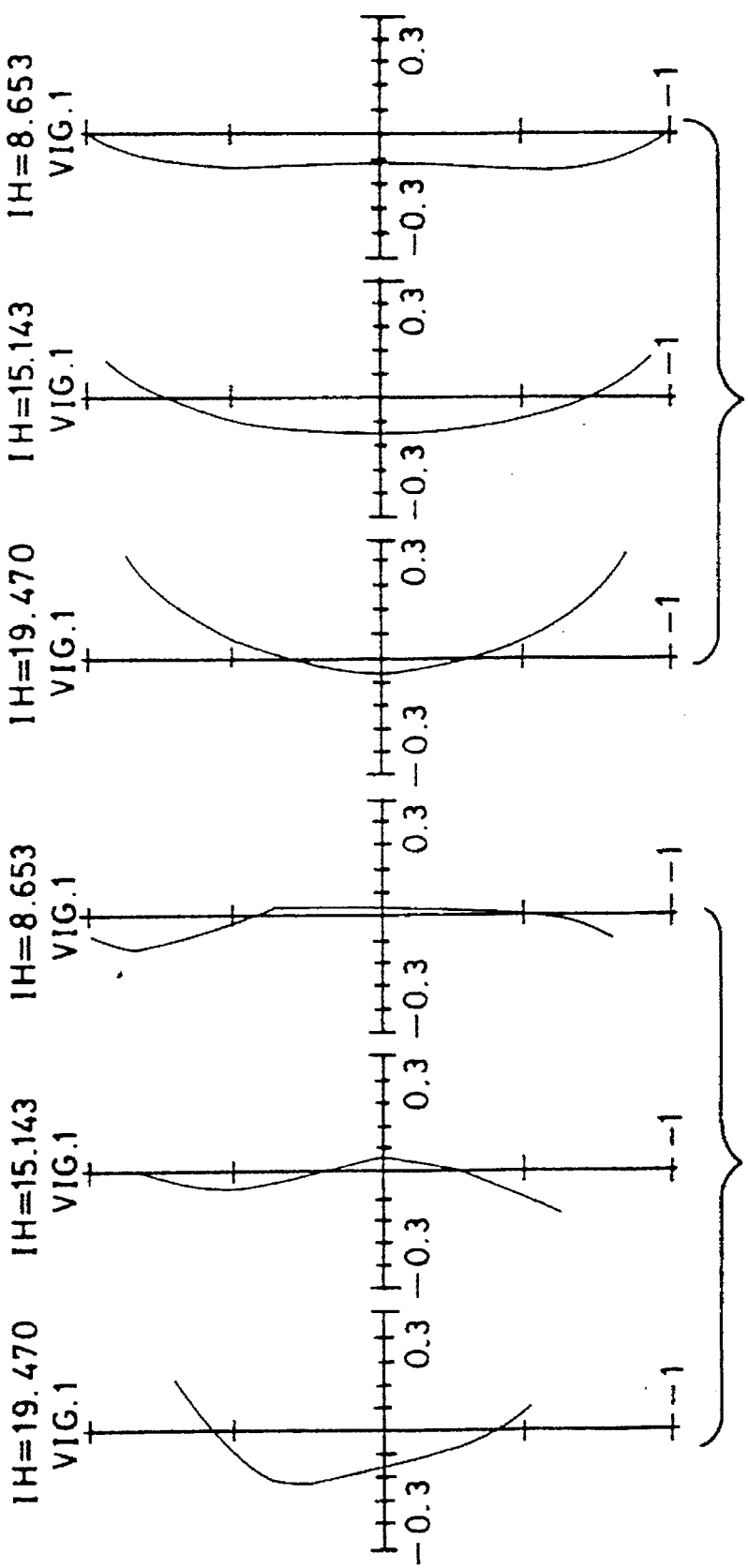

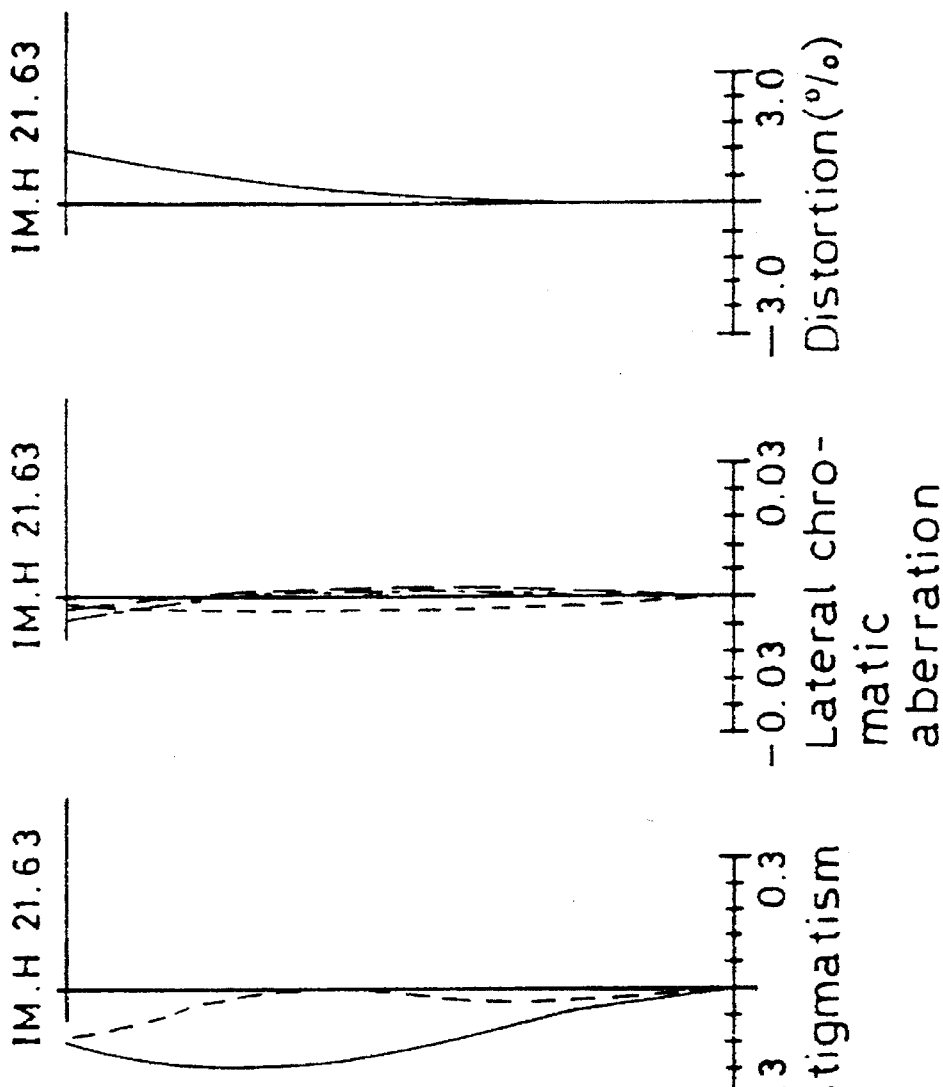

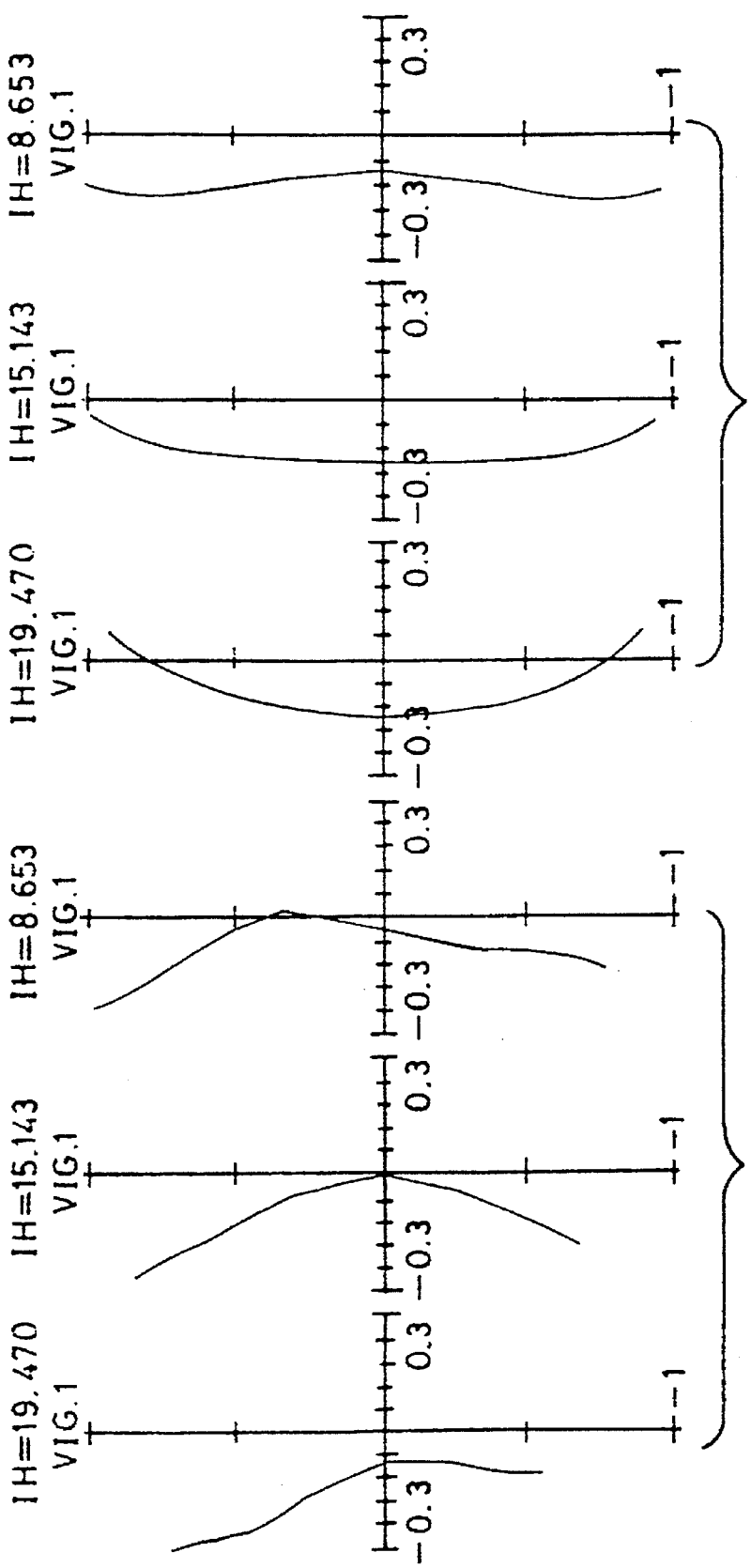

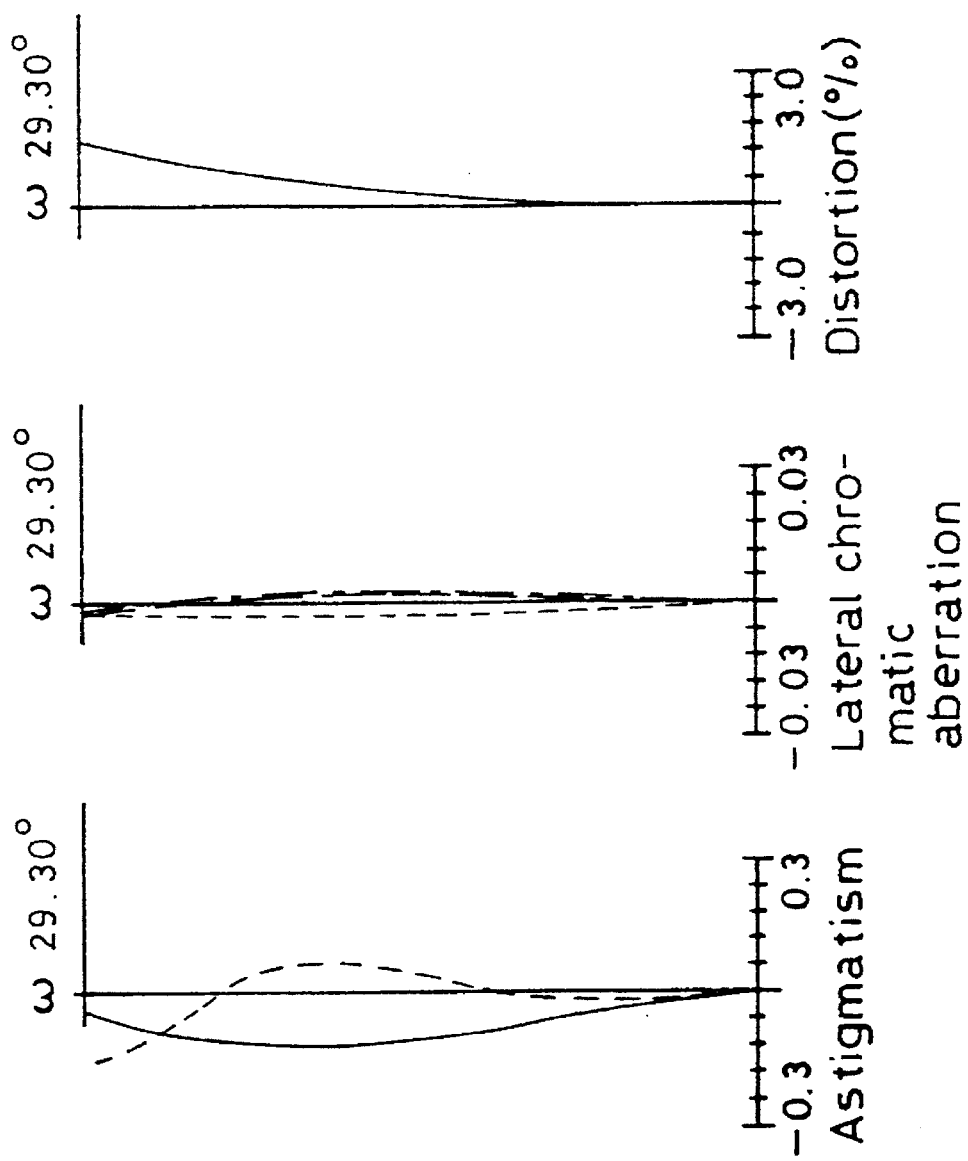

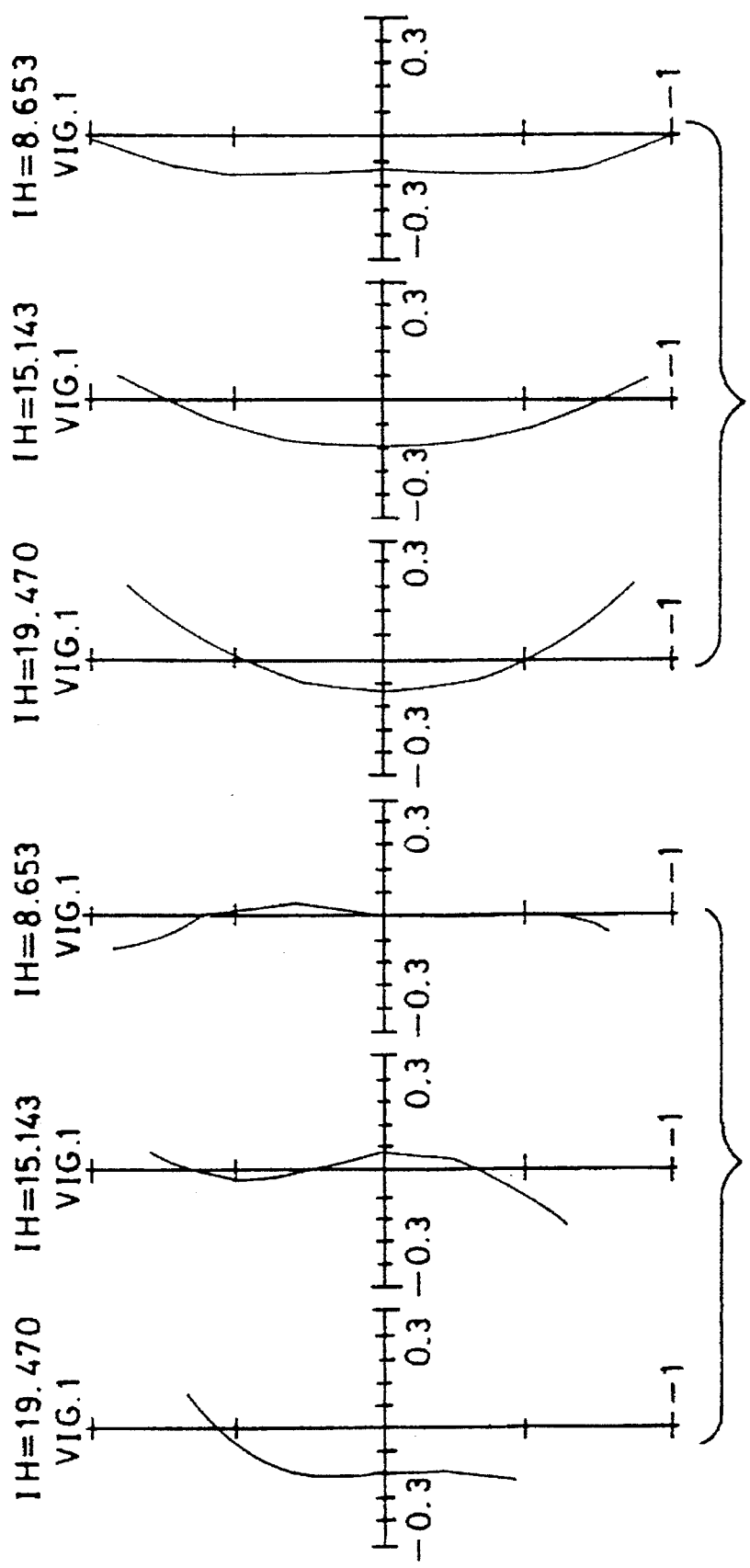

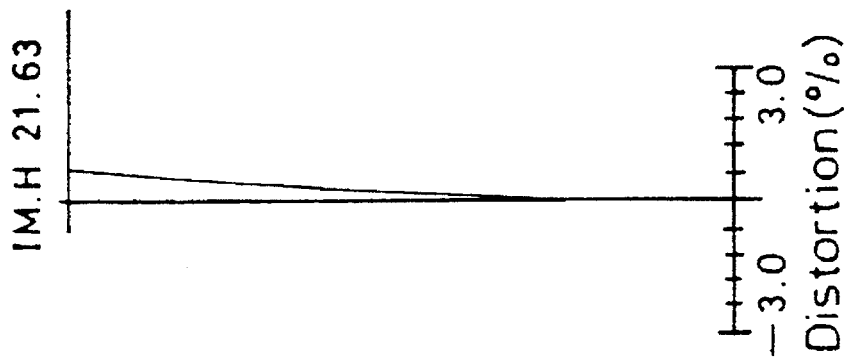
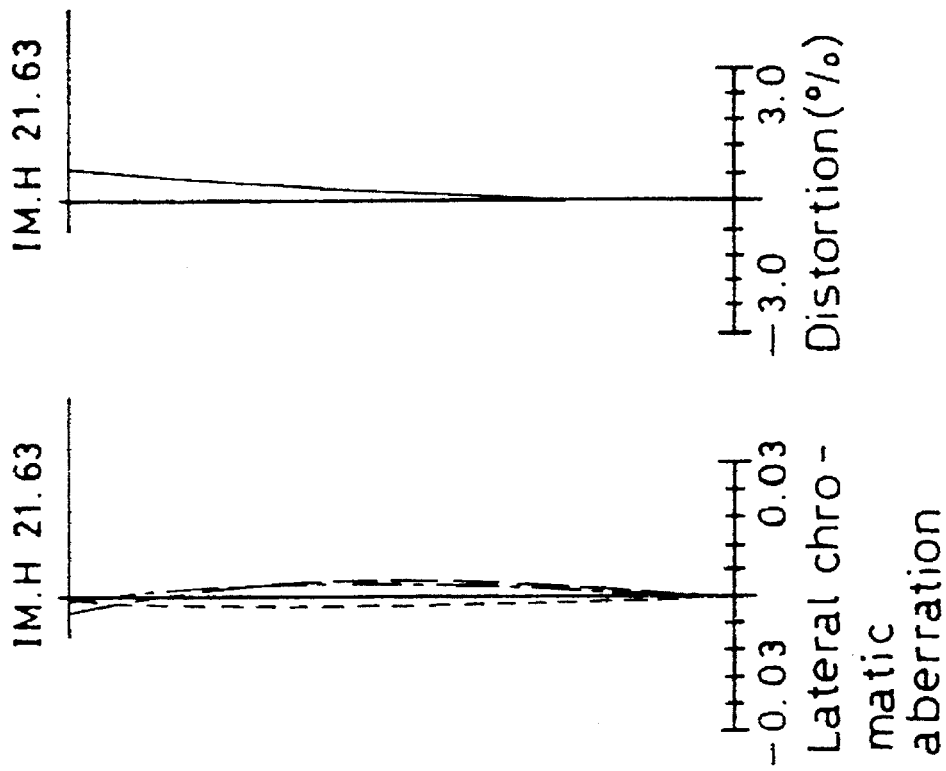
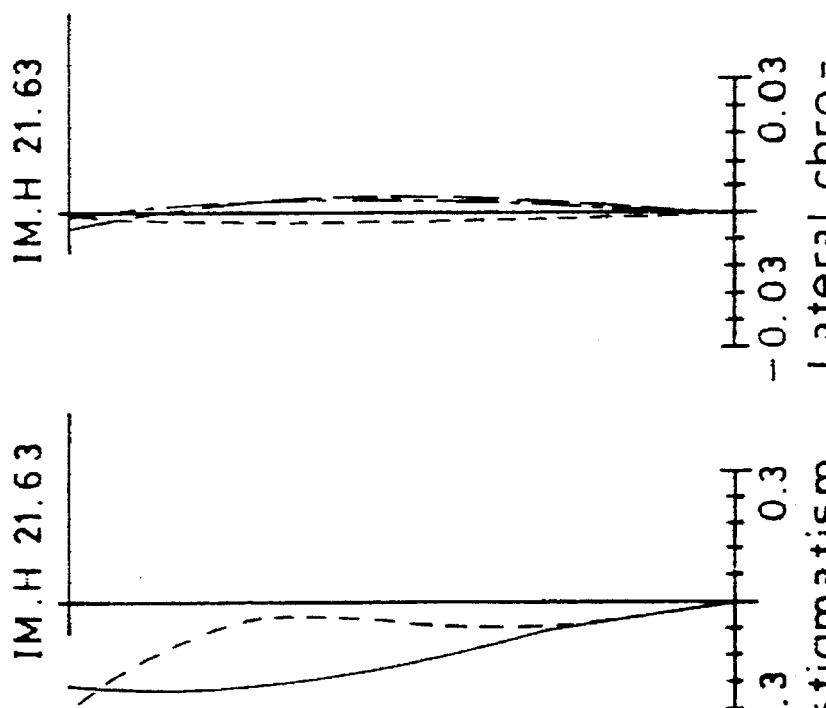
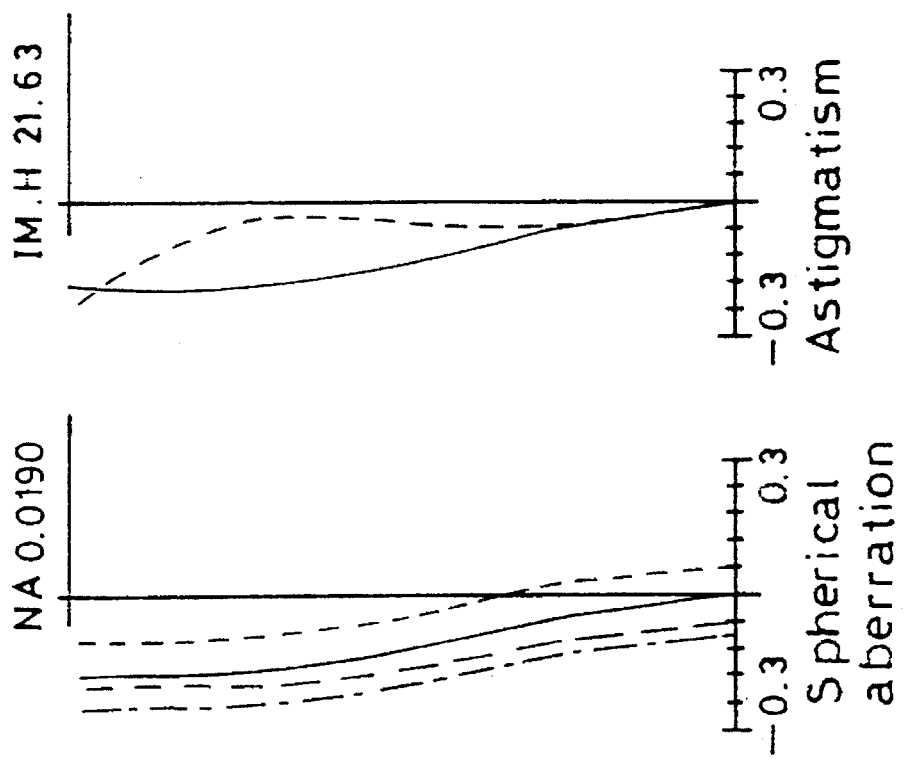

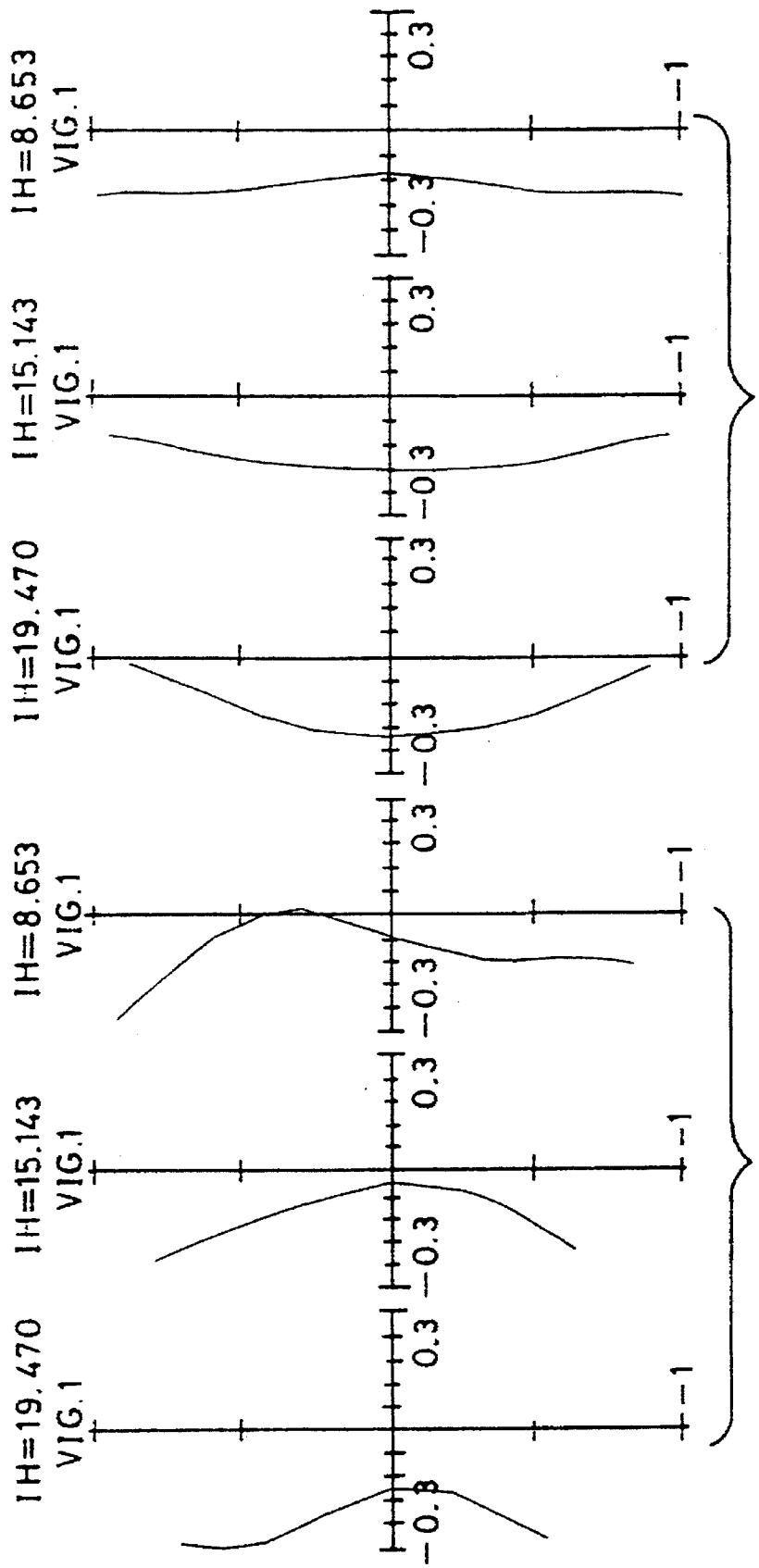

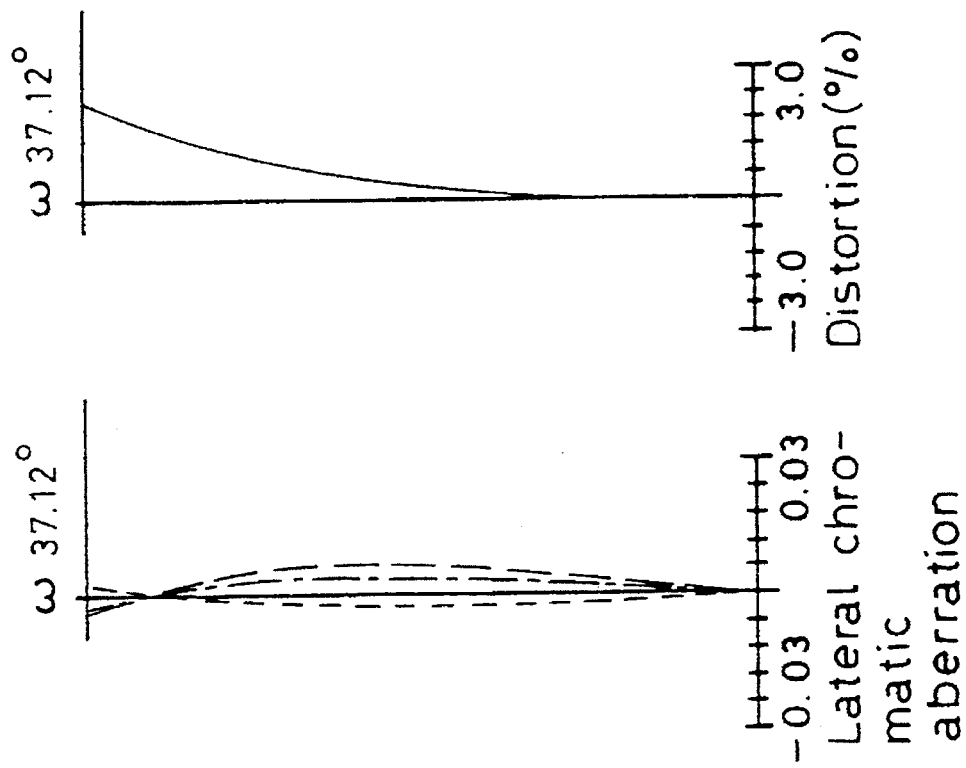

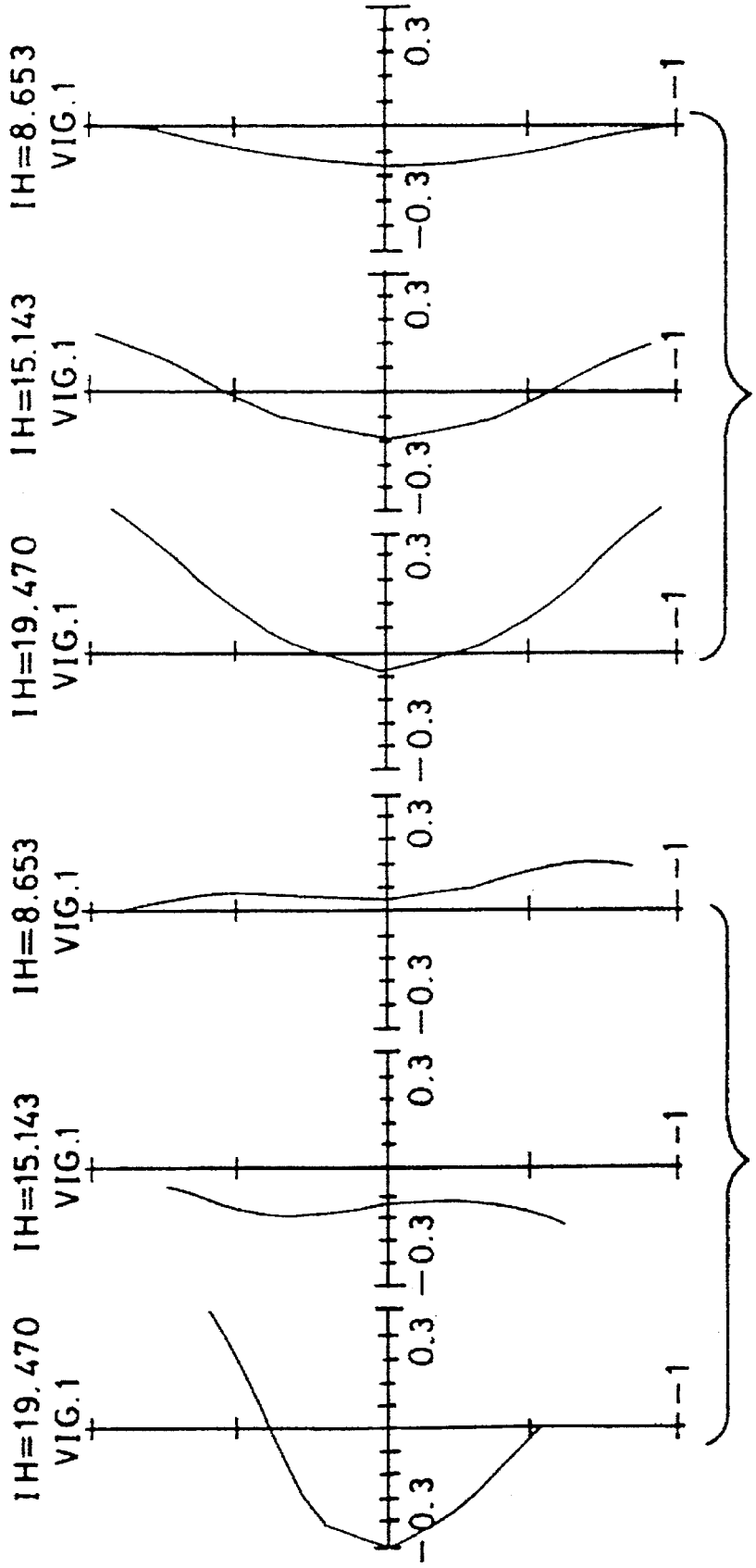

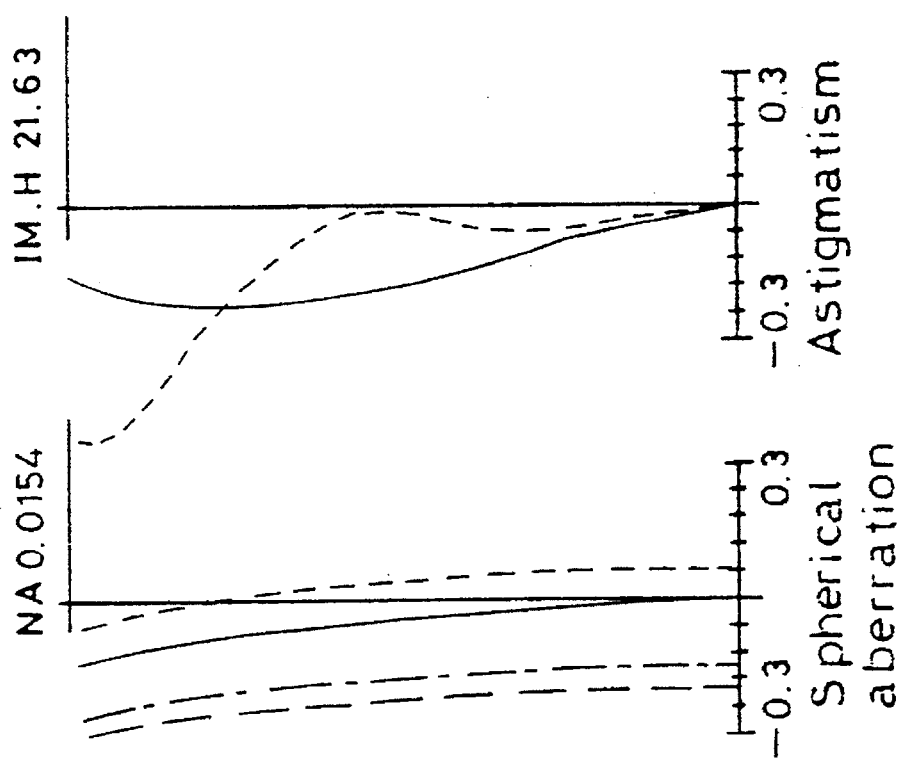

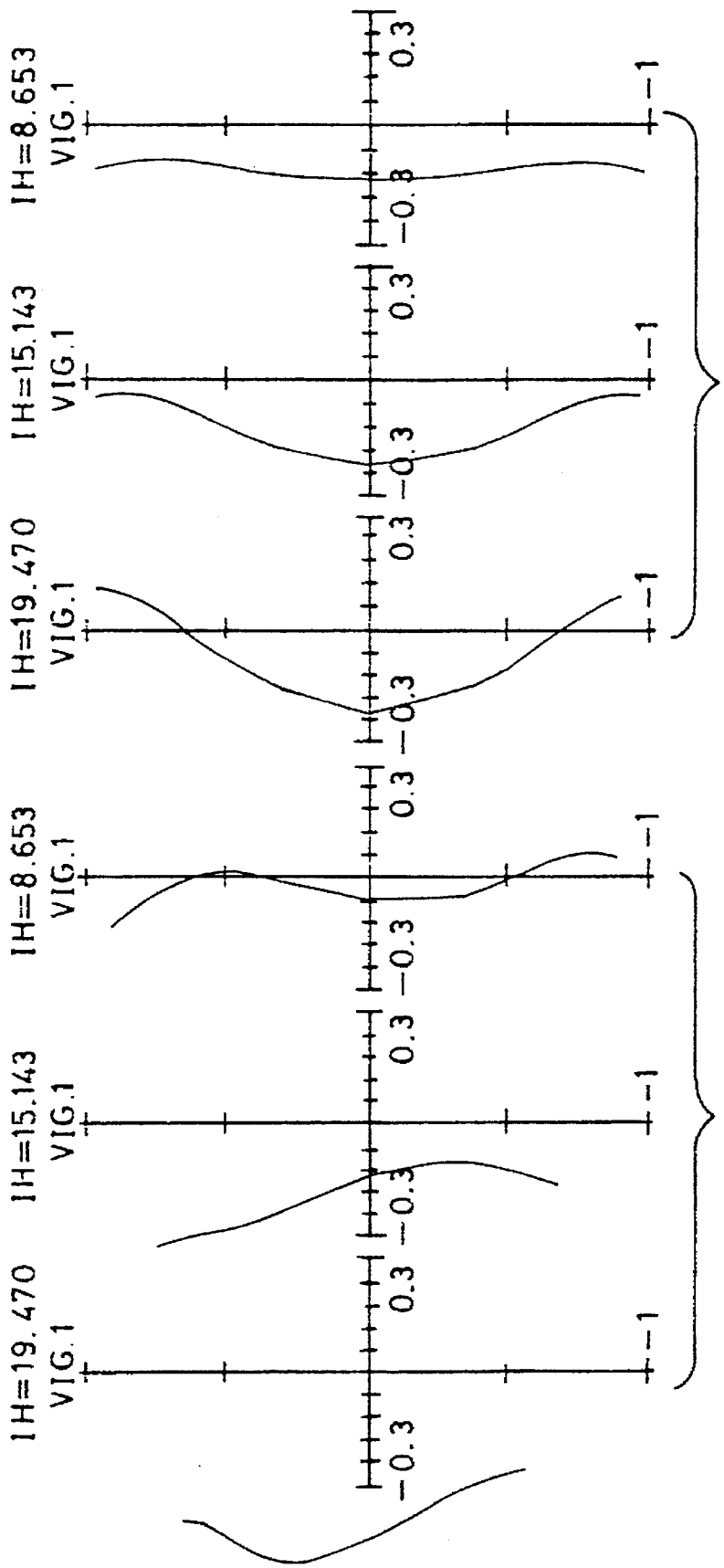

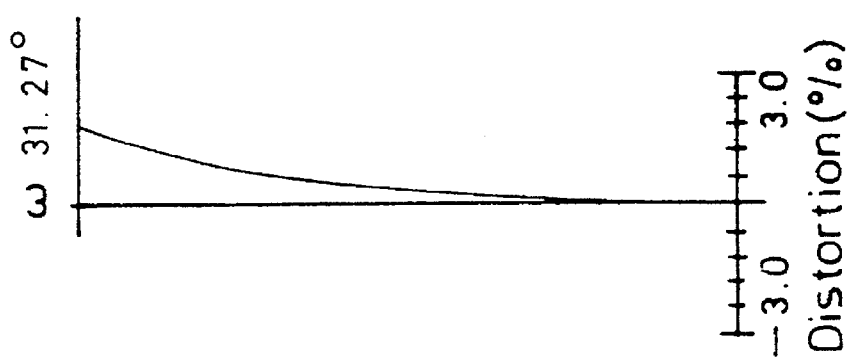
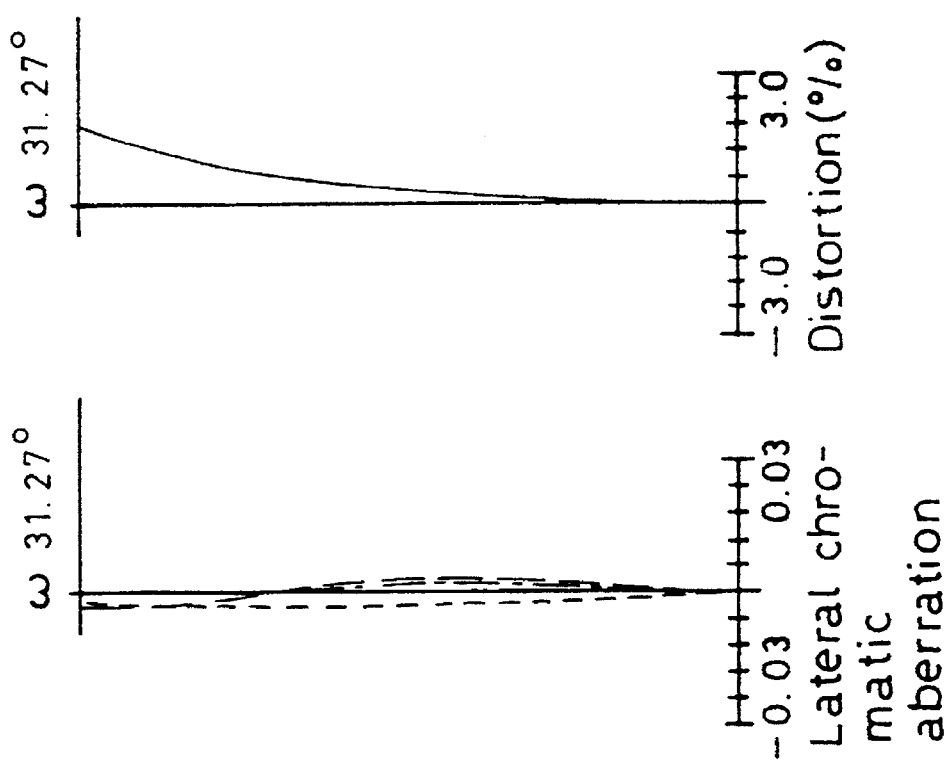
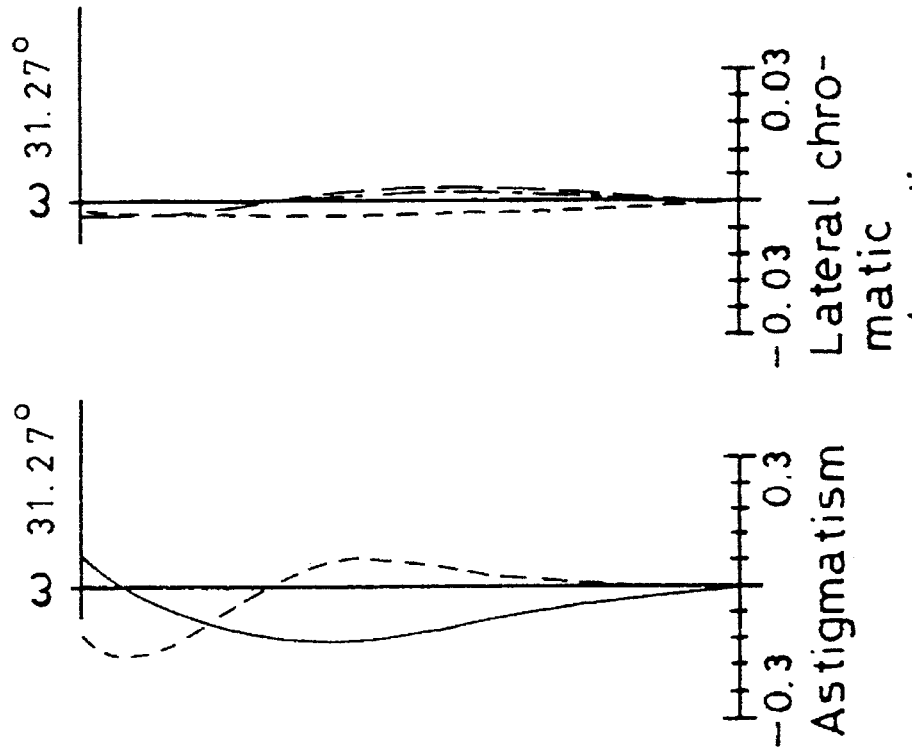
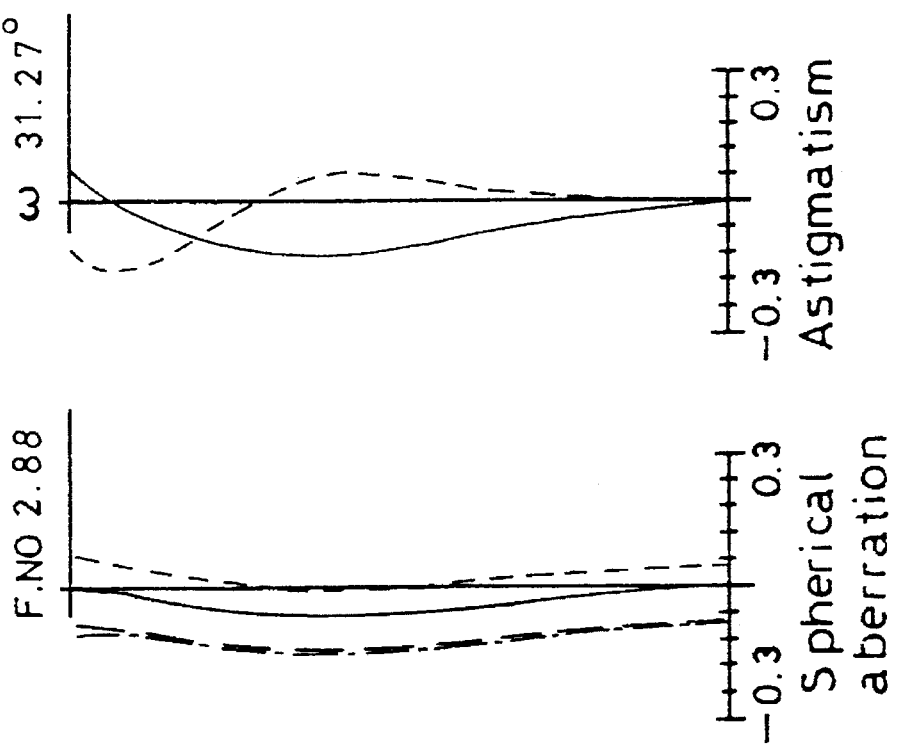

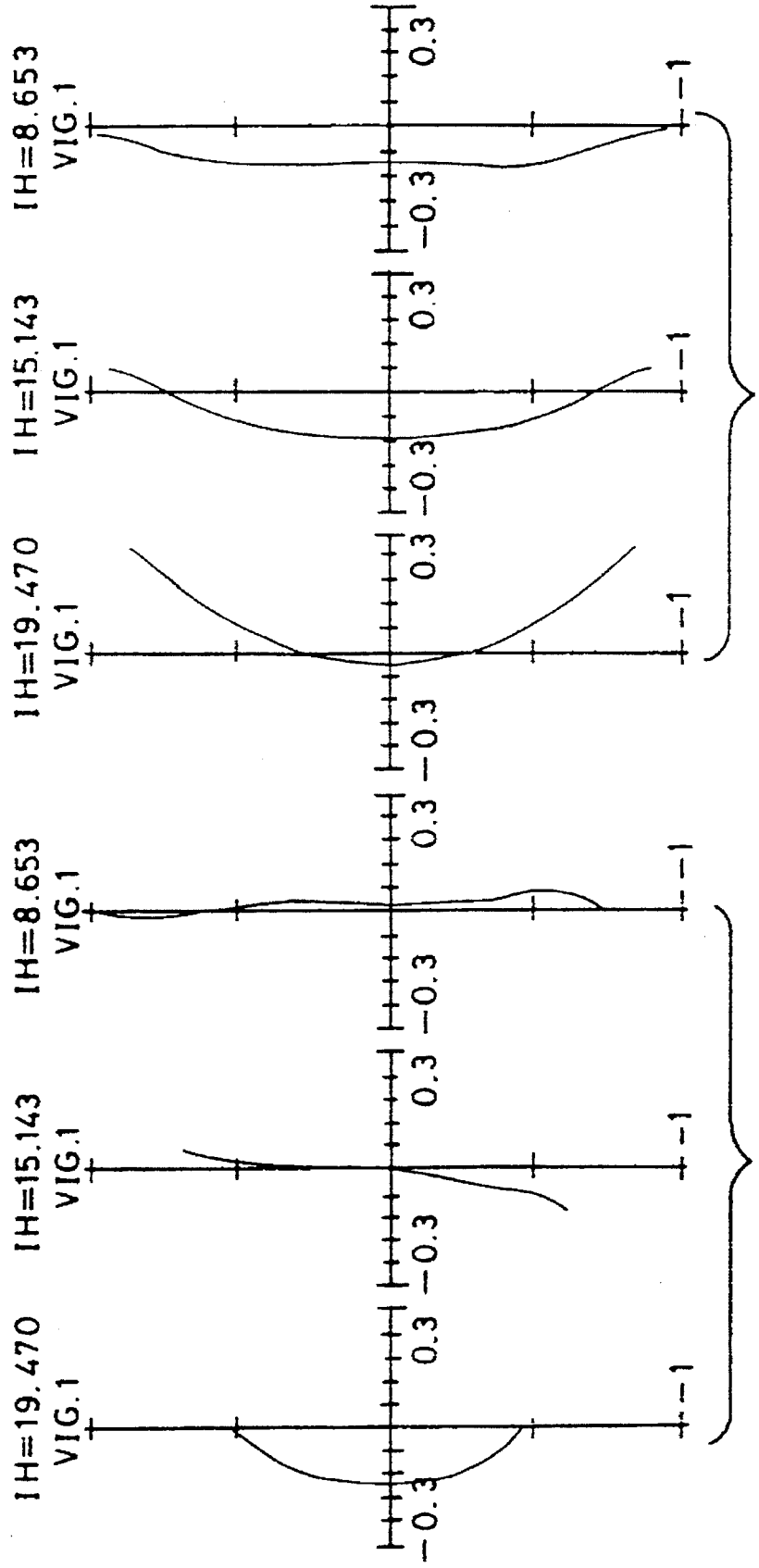

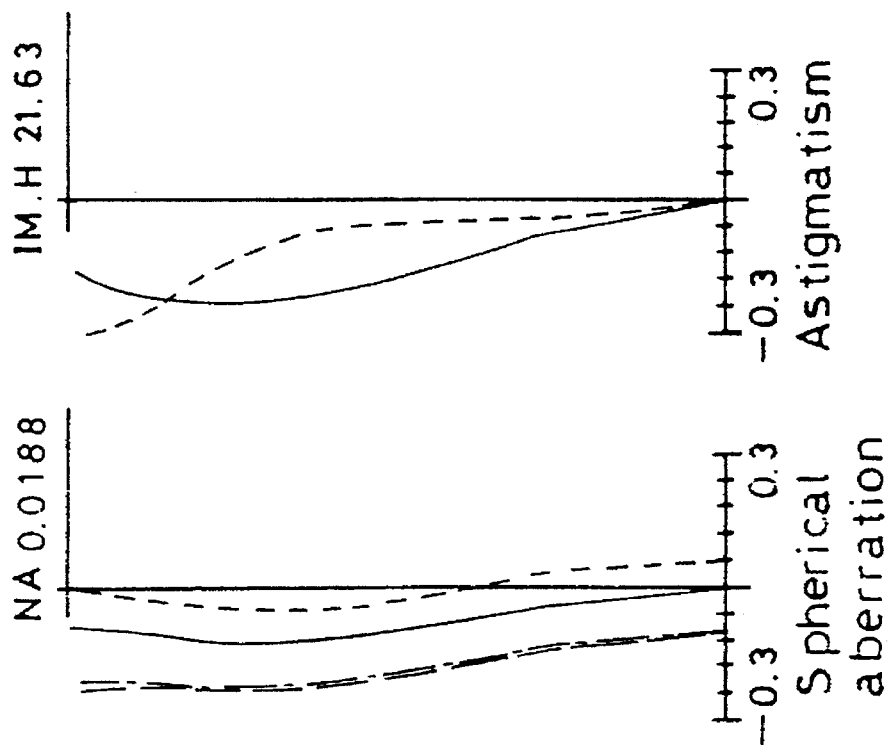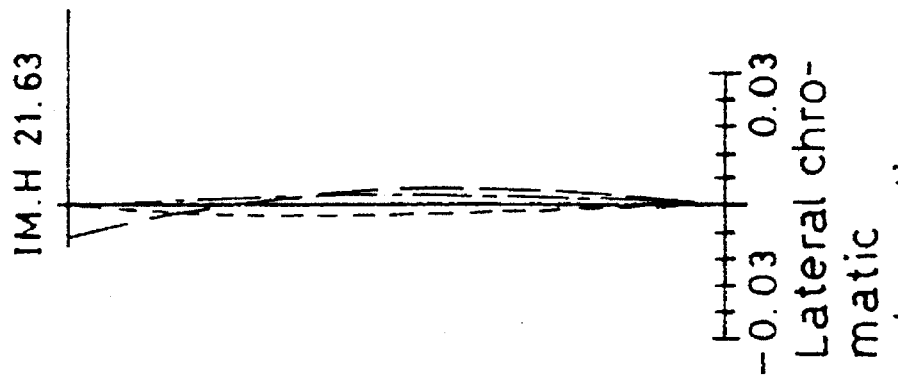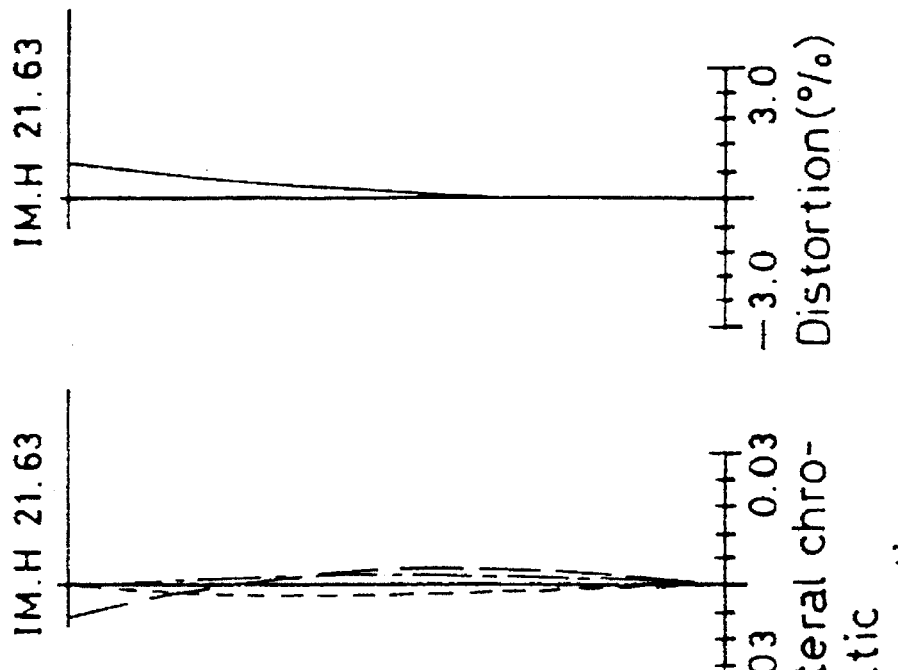

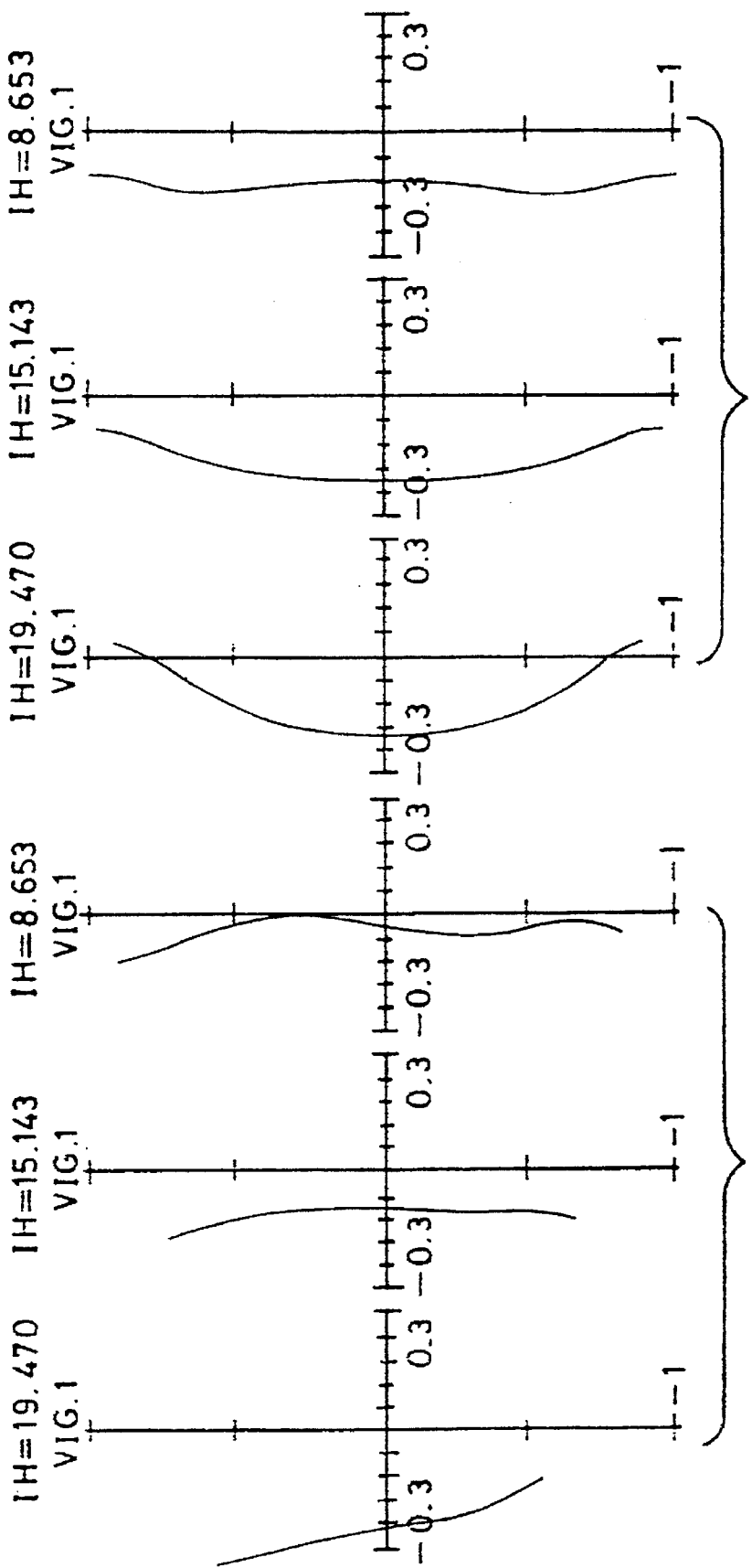

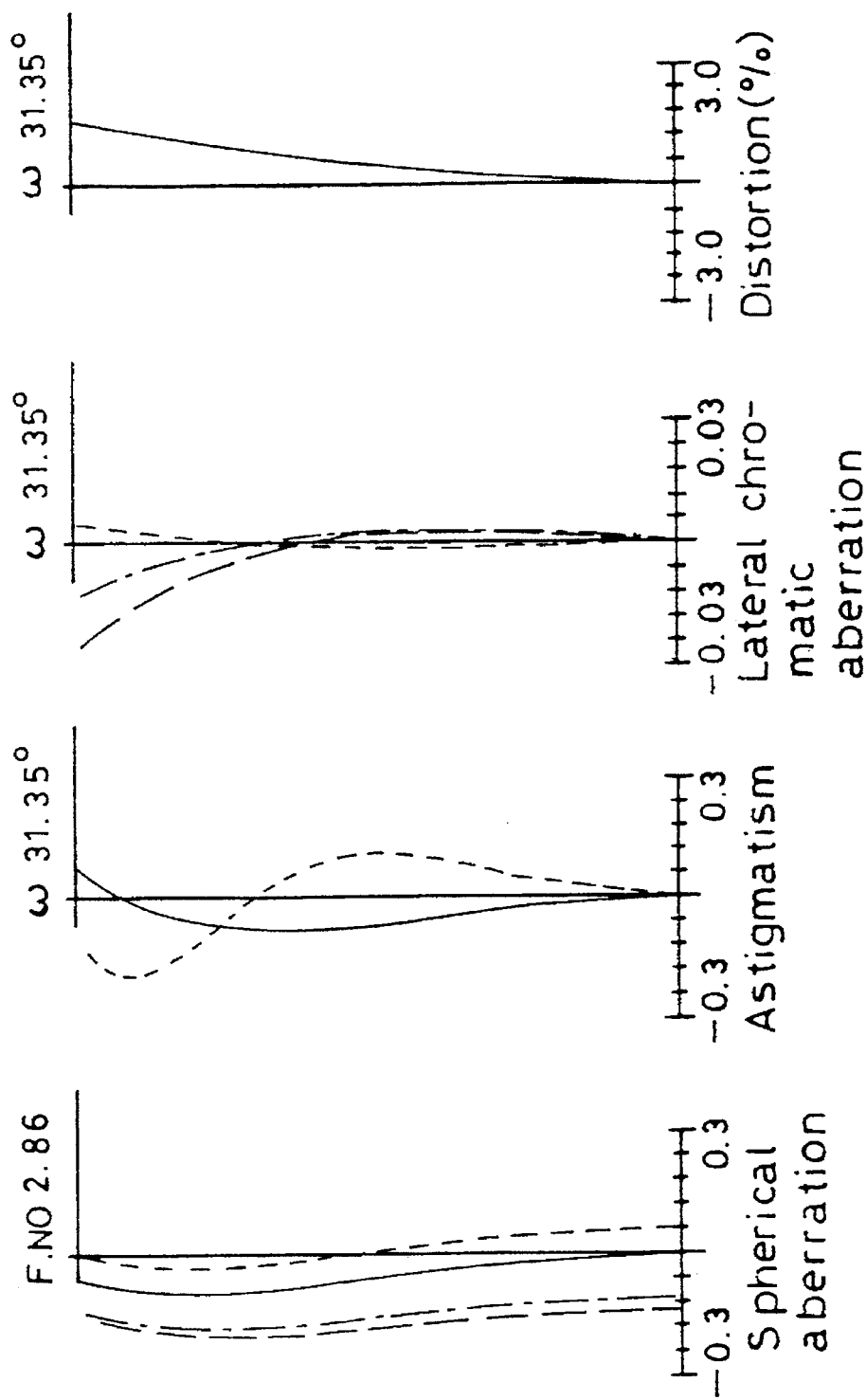

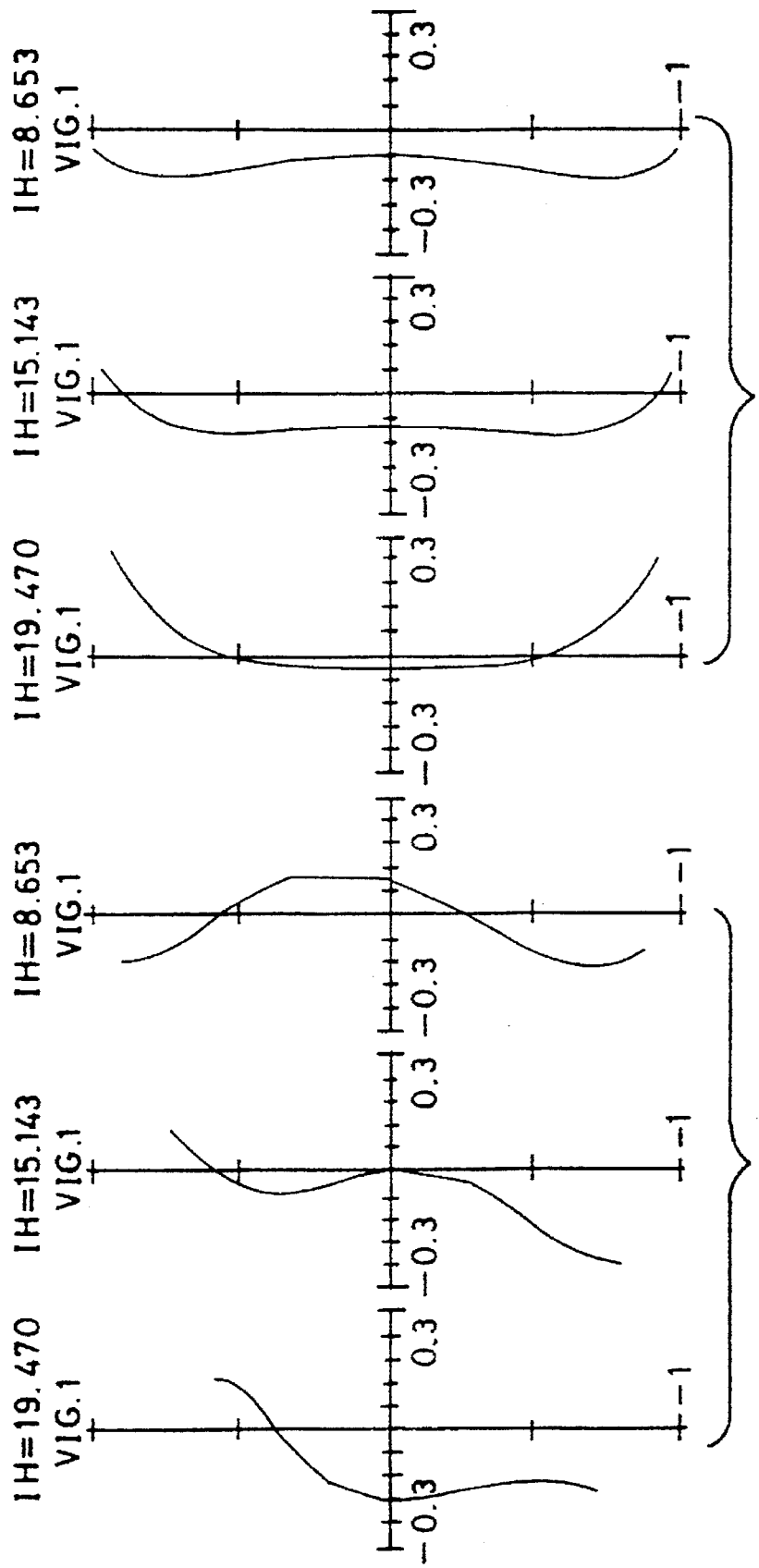

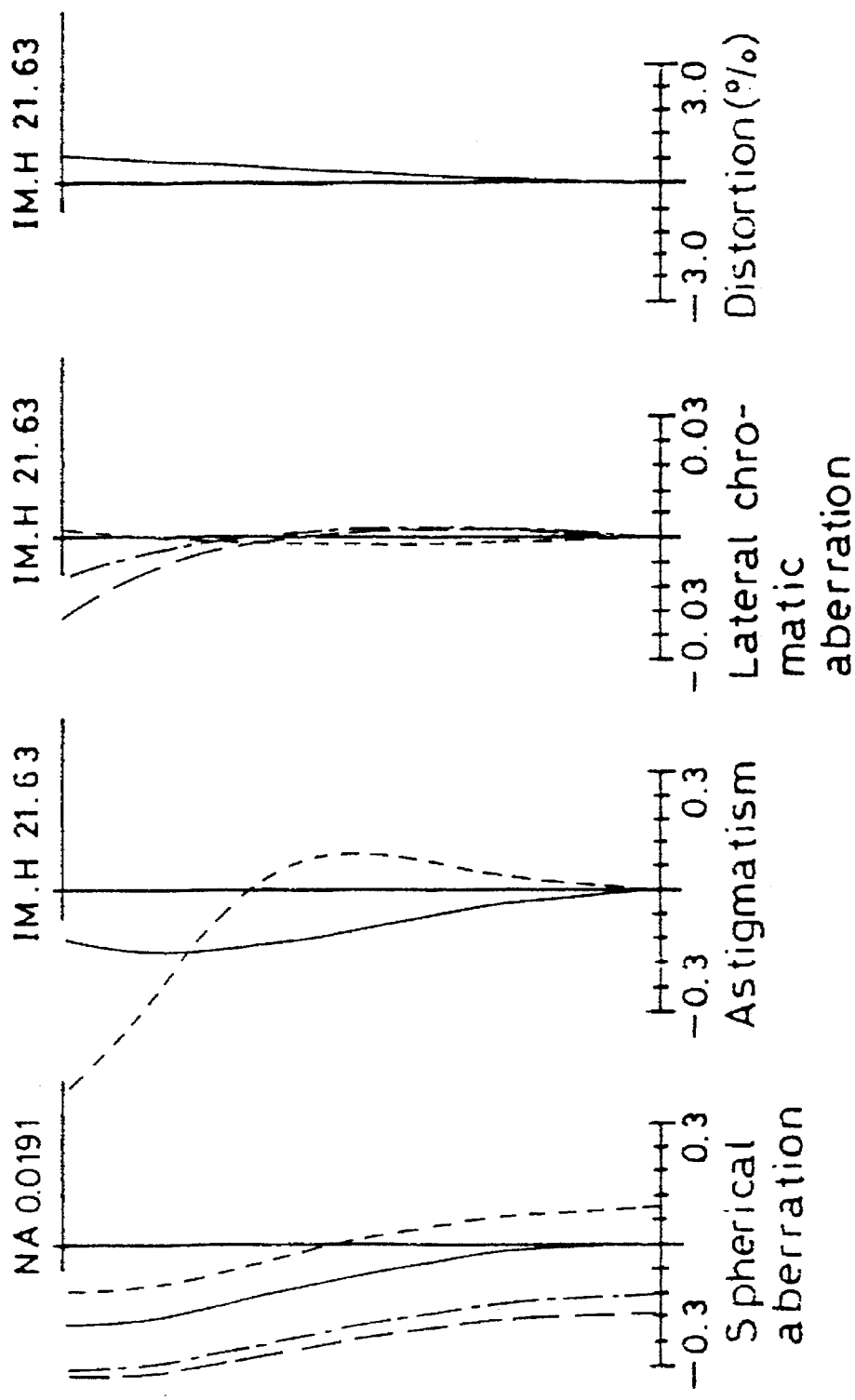

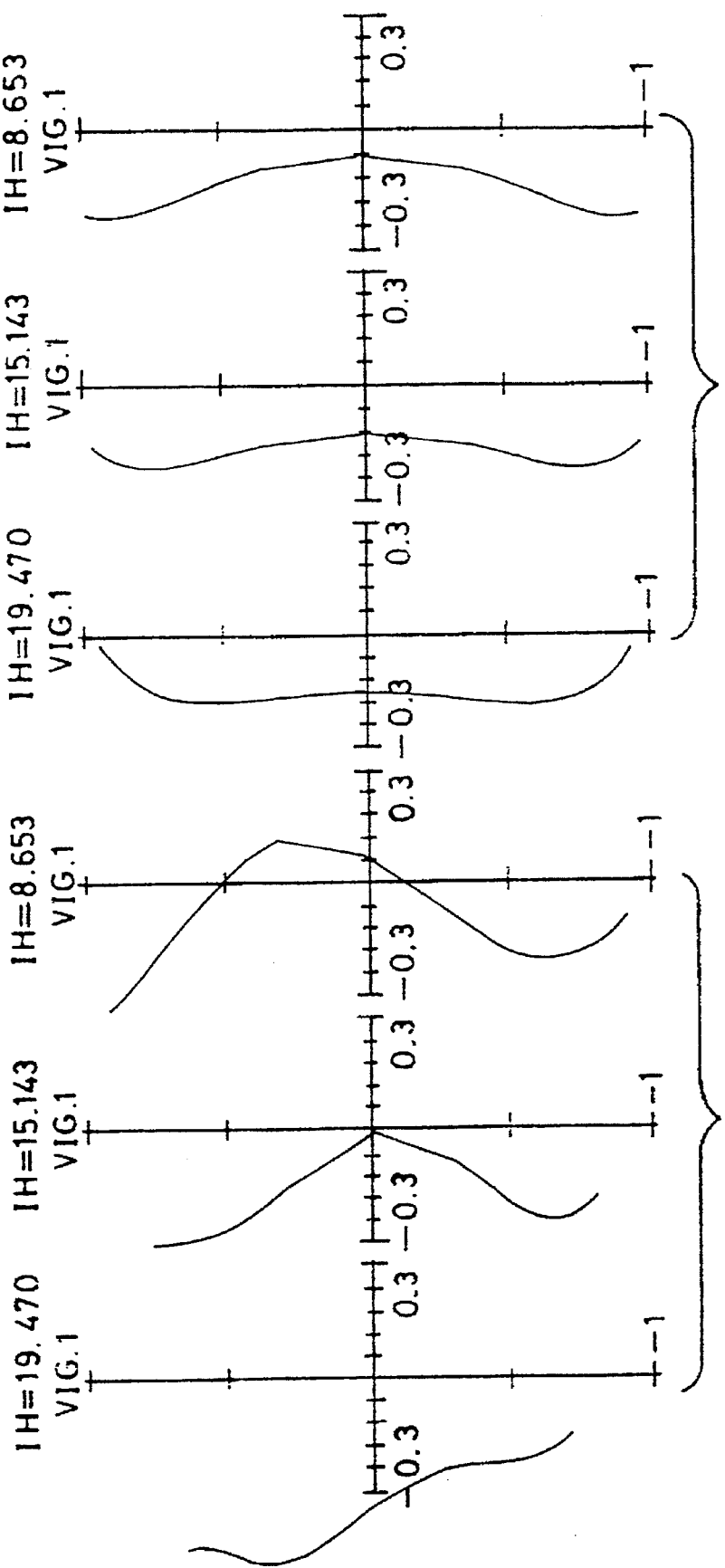

TAKING LENS SYSTEM

BACKGROUND OF THE INVENTION

The present invention relates to a photographic lens system and, more particularly, to a high-performance taking lens system suitable for a lens shutter type camera.

In order to realize a high-performance taking lens system for photography, which is capable of displaying superior optical performance as far as the edges of film image field with minimal deterioration of the performance, it is necessary to satisfactorily flatten the sagittal image surface and correct lateral chromatic aberration and comatic aberration.

Incidentally, the basic arrangement of the taking lens system according to the present invention, which will be described later, includes a Tessar type lens and a positive lens added to the image side of the Tessar type lens. Conventional lens systems such as Tessar and triplet type lens systems suffer from the disadvantages that the sagittal image surface tends to have a large curvature and that the astigmatism is also large.

For example, in a lens system such as that disclosed in Japanese Patent Application Laid-Open (KOKAI) No. 55-105216 (1980), the sagittal image surface tends to curve to a considerable extent, and the astigmatic difference increases as the distance from the center of image field increases toward the edge thereof. In addition, the lateral chromatic aberration is not satisfactorily corrected. Therefore, it is difficult to maintain the high performance of the lens system as far as the edge of image field.

Further, many of Tessar and triplet type lens systems have a behind-the-lens stop and hence need to ensure the brightness of the edge of image field and to consider the increase in size of the front lens system.

A lens system such as that disclosed in Japanese Patent Application Post-Exam Publication No. 04-43245 (1992) includes a Tessar type lens and a meniscus negative lens with a convex surface directed toward the image side, which is disposed on the image side of the Tessar type lens. Such a lens system is exceedingly effective in shortening the overall length of the system because the principal point can be disposed forward of the front lens by adding the negative lens on the image side of the Tessar type lens. However, it is necessary in order to realize a reduction in the overall size of the lens system to make the refractive power of the final negative lens relatively strong. Accordingly, the spherical aberration of this negative lens undesirably increases toward the plus side. In general, it is ideal to cancel the spherical aberration produced toward the plus side in the negative lens of the 2-nd lens unit by the cemented lens of the 3-rd lens unit. However, it is unfavorable from the viewpoint of balance to cancel the plus spherical aberration produced in the negative lens of the 2-nd lens unit and the final negative lens by only the cemented lens of the 3-rd lens unit. Therefore, the positive lens of the 1-st lens unit is inevitably assigned the canceling function. Accordingly, off-axis aberrations are also largely affected, as a matter of course. Particularly, coma and astigmatism are adversely affected. Therefore, such a lens arrangement is unsuitable for pursuing high performance, although it is very favorable for reduction in the overall size of the lens system.

Conventional techniques having a lens arrangement similar to that of the present invention have already been known as Japanese Patent Application Post-Exam Publication No. 56-42847 (1981), U.S. Pat. No. 4,240,705, etc. However, all these inventions relate to taking lens systems suitable for single-lens reflex cameras having a long back focus. Therefore, if these techniques are merely applied to a taking lens system for a lens shutter type camera, it is difficult to attain good balance between various aberrations because of the differences in terms of the stop position, the field angle, etc. With regard to the arrangement also, the doublet has a meniscus configuration with a convex surface directed toward the image side, which is different from the doublet in the present invention, which will be described later.

SUMMARY OF THE INVENTION

In view of the above-described problems of the related art, it is an object of the present invention to provide a novel, high-performance taking lens system suitable for a lens shutter type camera, which is capable of displaying superior optical performance as far as the edges of film image field with minimal deterioration of the performance despite a simple arrangement.

To attain the above-described object, the present invention provides a taking lens system having two lens units, that is, a front lens unit including at least one positive lens and at least one negative lens whose image-side surface has a higher curvature than that of the object-side surface thereof, and a rear lens unit disposed behind the front lens unit and including a doublet which consists of one positive lens and one negative lens and which has a positive refractive power as a whole, and a positive lens. The lens surface of the doublet that is the closest to the image side is concave toward the image side. The intermediate lens surface of the doublet is convex toward the image side.

In addition, the present invention provides a taking lens system having two lens units, that is, a front lens unit including at least one positive lens and at least one negative lens whose image-side surface has a higher curvature than that of the object-side surface thereof, and a rear lens unit including a doublet which consists of a positive lens and a negative lens and which has a positive refractive power as a whole, and a positive lens. Focusing from the infinite object point to a near object point is effected by varying the spacing between the front and rear lens units.

In addition, the present invention provides a taking lens system having two lens units, that is, a front lens unit including at least one positive lens and at least one negative lens, and a rear lens unit including a doublet which consists of a positive lens and a negative lens, and a positive lens provided on the image side of the doublet. Focusing from the infinite object point to a near object point is effected by individually moving the front and rear lens units toward the object side while varying the spacing therebetween.

In addition, the present invention provides a two-unit taking lens system including, in order from the object side, a front lens unit having a 1-st lens group of positive power and a 2-nd lens group of negative power, an aperture stop, and a rear lens unit having a 3-rd lens group which includes a doublet consisting of a positive lens and a negative lens and which has a positive power as a whole, and a 4-th lens group of a single positive lens.

In this case, focusing from the infinite object point to a near object point can be effected by varying the spacing between the front lens unit and the aperture stop. It is also possible to effect focusing from the infinite object point to a near object point by moving the front lens unit toward the object side while moving the aperture stop and the rear lens unit together as one unit toward the object side.

In the above taking lens systems, the positive and negative lenses of the doublet may be provided to face each other across an air spacing.

In addition, the present invention provides a taking lens system having two lens units, that is, a front lens unit including at least one positive lens and at least one negative lens whose image-side surface has a higher curvature than that of the object-side surface thereof, and a rear lens unit including a doublet which consists of a positive lens and a negative lens and which has a positive refractive power as a whole, and a positive lens. The lens surface of the doublet that is the closest to the image side is concave toward the image side. Focusing from the infinite object point to a near object point is effected by varying the spacing between the front and rear lens units.

In addition, the present invention provides a taking lens system having two lens units, that is, a front lens unit including at least one positive lens and at least one negative lens whose image-side surface has a higher curvature than that of the object-side surface thereof, and a rear lens unit including a doublet which consists of a positive lens and a negative lens and which has a positive refractive power as a whole, and a positive lens. The lens surface of the doublet that is the closest to the image side is concave toward the image side. The respective facing surfaces of the positive and negative lenses of the doublet are both convex toward the image side. Focusing from the infinite object point to a near object point is effected by varying the spacing between the front and rear lens units.

In the above taking lens systems, the positive and negative lenses of the doublet may be cemented together. Further, the front lens unit may be a cemented lens. Furthermore, at least one negative lens of the front lens unit may have a meniscus configuration with a concave surface directed toward the image side. The lens surface of the doublet that is the closest to the object side may be convex toward the object side. In addition, the absolute value of power of the lens surface of the doublet that is the closest to the image side may be larger than that of the lens surface of the doublet that is the closest to the object side.

In the above-described taking lens systems, it is preferable to satisfy the following condition (1):

(1) $0.4f < |R_N|$ where $R_N$ is the radius of curvature of the object-side lens surface of the negative lens in the front lens unit, and f is the focal length of the entire lens system.

It is also preferable to satisfy the following condition (2):

(2) $0 < f/f_4 < 0.85$ where $f_4$ is the focal length of the positive lens group behind the doublet, and f is the focal length of the entire lens system.

Further, it is preferable to satisfy the following condition (3):

(3) $0.3f < |(N_a - N_b)/R_c| < 1.5f$ where $N_a$ is the refractive index of the positive lens of the doublet, $N_b$ is the refractive index of the negative lens of the doublet, $R_c$ is the radius of curvature of the cemented surface of the doublet, and f is the focal length of the entire lens system.

Furthermore, it is preferable to satisfy the following condition (4):

(4) $0.01 < |f_{II}/f_I| < 0.25$ where $f_I$ and $f_{II}$ are the focal lengths of the front and rear lens units, respectively.

In addition, it is preferable to satisfy the following condition (5):

(5) $0.01 < |f/f_I| < 0.30$ where $f_I$ is the focal length of the front lens unit, and f is the focal length of the entire lens system.

The reason for adopting the above-described arrangements and the functions thereof will be explained below.

First, the reason for adding a positive lens to the image side of a conventional Tessar type lens system will be explained. When a negative lens is added to the image side of a conventional Tessar type lens system, problems as those described above in connection with the background art arise. In addition, Tessar type lens systems generally tend to become difficult to correct for aberrations as the angle of view widens. Therefore, when a lens system having a view angle $2\omega$ of the order of 58° to 74° as in the present invention is considered, it is difficult with a Tessar type lens system alone to realize a taking lens system capable of displaying superior optical performance as far as the edges of image field with minimal deterioration of the performance. Therefore, in the present invention, the view angle of the Tessar type lens system is made rather small, and a positive single lens is attached to the image side of the Tessar type lens system, thereby widening the view angle in a wide conversion manner. The system is intended to flatten the sagittal image surface, which cannot satisfactorily be corrected by the Tessar type lens system. As will be understood by looking at the aberration coefficients, the present invention schemes to maintain the flatness of the sagittal image surface by providing a plus astigmatism coefficient to the minus Petzval's error. It should be noted that any form of positive lens may be used as the above-described positive lens.

It should also be noted that the positive lens also serves to correct distortion, and the distortion correcting effect is enhanced as the positive refractive power is intensified. However, the refractive power should not be excessively strong with a view to attaining good balance with other aberrations.

Secondly, the configuration and function of the doublet, which constitutes the rear lens unit, will be explained. Although in the following description the doublet is in the form of a cemented lens, for example, it should be noted that the doublet is not necessarily limited thereto. If the cemented surfaces of the two lens elements are separated from each other, the degree of freedom correspondingly increases, advantageously. However, the doublet is preferably in the form of a cemented lens with a view to facilitating the production thereof.

The configuration of the doublet depends on the way in which spherical and off-axis aberrations are balanced with each other. In the lens system of the present invention, the most effective lens surface for correction of plus spherical aberration produced in the negative lens of the front lens unit is the cemented surface of the above-described doublet, which is convex toward the image side, and this cemented surface also serves as a remarkably effective lens surface for correction of the minus comatic aberration produced in the front lens unit. To realize a high-performance taking lens system, which is the object of the present invention, it is necessary to minimize the occurrence of comatic aberration at the edges of image field. Therefore, to obtain the desired coma correcting effect, it is preferable that the curvature of the cemented surface should be made relatively high without producing an adverse effect on spherical and various other aberrations, and that the lens surface of the doublet that is the closest to the image side should be concave toward the image side. By meeting these requirements, the balance between astigmatism, spherical aberration and coma is kept.

In addition, at least one negative lens in the front lens unit preferably has such a configuration that the image-side surface thereof has a higher curvature than that of the object-side surface thereof, with a view to enhancing the effect produced by the action of the above-described doublet. This negative lens suppresses the occurrence of the large minus comatic aberration, thereby reducing the load on the doublet for aberration correction.

With the above-described lens arrangement and configuration, various aberrations can be favorably corrected with good balance, and it is possible to realize a high-performance taking lens system, which is capable of displaying superior optical performance as far as the edges of image field with minimal deterioration of the performance. More preferably, the lens surface of the doublet that is the closest to the object side is also concave toward the image side. In this case, it is preferable that the curvature of the lens surface should be relatively low. Particularly, it is preferable that the lens surface that is the closest to the image side should have a higher curvature than that of the lens surface that is the closest to the object side. With this arrangement, the above-described function can be exhibited even more effectively.

With regard to chromatic aberrations, an effective way of correcting these aberrations is to make the Abbe's numbers $v_a$ and $v_b$ of the positive and negative lenses of the doublet relatively large and small, respectively. In actual practice, it is preferable to select glass materials for the lenses within the following ranges:

$$v_a > 35; v_b < 60$$

Further, the taking lens system of the present invention is characterized in that at least one negative lens in the front lens unit is a meniscus negative lens having a concave surface directed toward the image side. The function of the negative lens in the front lens unit will be explained below. To allow the above-described effect to be exhibited most favorably in the correction of spherical and comatic aberrations in the doublet, aberrations produced in the front lens unit must be effectively adjusted so that the aberrations can be completely corrected in the following lens unit. In particular, if the negative lens has such a configuration that the object-side surface thereof has a high curvature, large minus comatic aberration is produced, which cannot completely be corrected in the following lens unit. It is preferable that the object-side surface of the negative lens should be relatively low. Furthermore, if the negative lens has a meniscus configuration with a convex surface directed toward the object side, the effect produced by the action of the negative lens is further enhanced.

In addition, it is preferable to satisfy the following condition:

(1) $0.4f < |R_N|$ where $R_N$ is the radius of curvature of the object-side lens surface of the negative lens in the front lens unit, and f is the focal length of the entire lens system.

The meaning of the condition (1) will be explained below. As has been described above, the minus comatic aberration produced in the front lens unit is corrected by the action of the cemented surface of the doublet. If the curvature of the object-side surface of the negative lens in the front lens unit is excessively high, the curvature of the image-side surface thereof inevitably becomes high, causing large comatic aberration to be produced in this negative lens, which cannot completely be corrected in the rear lens unit. Accordingly, it is preferable for $R_N$ to have a relatively large value (low curvature). By satisfying the condition (1), spherical and comatic aberrations can be corrected with good balance in the rear lens unit.

It is also preferable to satisfy the following condition:

(2) $0 < f/f_4 < 0.85$ where $f_4$ is the focal length of the positive 4-th lens group behind the doublet.

The meaning of the condition (2) is as follows: By keeping $f/f_4$ within the above range, it is possible to effectively flatten the image field, correct distortion and make fine adjustment of various aberrations. If the upper limit of the above range is exceeded, the sagittal image surface curves to a considerable extent.

Further, when the doublet is in the form of a cemented lens, it is preferable to satisfy the following condition:

(3) $0.3/f < |(N_a - N_b)/R_c| < 1.5/f$ where $N_a$ is the refractive index of the positive lens of the doublet, $N_b$ is the refractive index of the negative lens of the doublet, and $R_c$ is the radius of curvature of the cemented surface of the doublet.

The meaning of the condition (3) is as follows: The doublet is capable of balancing comatic and spherical aberrations with each other, as described above. The effect produced by the action of the doublet is further enhanced by satisfying the condition (3). If the upper limit of the condition (3) is exceeded, although it becomes favorable for the correction of coma, the balance with other aberrations becomes no good, and the Petzval's sum becomes excessively large. If the lower limit of the condition (3) is not reached, it become difficult to correct coma at the edges of image field.

With the taking lens system of the present invention, which has the above-described arrangement, it is possible to attain a high-performance taking lens system with no deviation of image field as far as the edges thereof, which has heretofore been impossible to achieve with the conventional lens systems of this type. In addition, since the amount of aberration produced at each lens surface is minimized, it is possible to attain a taking lens system which is not readily affected by errors in production.

As will be clear by glancing at the graphic representation of aberrations in Examples (described later), considering the number of constituent lens elements, the taking lens system of the present invention is markedly improved in the performance in terms of the achievement of a flat sagittal image surface and the correction of lateral chromatic aberration, coma and other aberrations as far as the edges of image field.

In addition, the taking lens system of the present invention is characterized in that focusing from the infinite object point to a near object point is effected by moving the front and rear lens units together as one unit toward the object side while varying the air spacing therebetween.

It is common for a taking lens system such as that of the present invention to adopt a focusing system whereby the lens system is moved as a whole to effect focusing. With such a focusing system, however, when the image magnification is about −1/10, which is a practical image magnification for photography at a near object point, the fluctuation of astigmatism becomes exceedingly large, causing the performance to deteriorate considerably. Therefore, the present invention adopts so-called floating system to stabilize the optical performance at a near object point and to further shorten the closest focusing distance. Thus, the fluctuation of astigmatism which is left uncorrected by the movement of the whole lens system is minimized by finely varying the air spacing between the two lens units.

With a view to stabilizing the optical performance at a near object point, the aperture stop is preferably disposed between the two lens units (that is, in front of the doublet). With a conventional system wherein floating is effected by varying a space other than the stop space, it is difficult to effectively correct off-axis chromatic aberration, although aberration for reference wavelength can be corrected. In the present invention, however, floating is effected by varying the stop space, thereby making it possible to minimize the fluctuation of various aberrations, particularly astigmatism, lateral chromatic aberration and coma, when the system is focused at a near object point.

Further, it is preferable to effect focusing by moving the two lens units together as one unit toward the object side while increasing the air spacing therebetween. The movement of the two lens units during focusing may be expressed by the linear function of Y=ax+b, where Y is the amount of change of the air spacing between the two lens units, and X is the amount of change of the back focus. This shows that the movement of the front and rear lens units for focusing at a near object point is linear. Actually, in Example 1 (described later), the two lens units are adapted to move in accordance with the image magnification in the relation of Y=0.0588X+2.4916.

Furthermore, it is preferable to satisfy the following conditions with a view to stabilizing the optical performance at a near object point:

(4) $0.01 < |f_{II}/f_I| < 0.25$ (5) $0.01 < |f/f_I| < 0.30$ where f is the composite focal length of the entire lens system when focused at the infinite object point, and $f_I$ and $f_{II}$ are the focal lengths of the front and rear lens units, respectively.

The condition (4) determines the ratio between the focal lengths of the front and rear lens units, that is, the refractive power distribution to the two lens units. If the upper limit of the condition (4) is exceeded, the refractive power of the front lens unit becomes excessively strong, causing an increase in the amount of various aberrations produced in the front lens unit. As a result, it becomes impossible to correct the aberrations satisfactorily in the rear lens unit. If the lower limit of the condition (4) is not reached, although off-axis aberrations at the infinite object point can be effectively corrected, the fluctuation of various aberrations increases when the system is focused at a near object point, so that the performance deteriorates to a considerable extent. Thus, it becomes difficult to shorten the closest focusing distance.

The condition (5) means the ratio of the focal length of the front lens unit to the composite focal length of the entire lens system. If the upper limit of the condition (5) is exceeded, the refractive power of the front lens unit becomes excessively strong, causing an increase in the amount of various aberrations produced in the front lens unit. As a result, it becomes impossible to correct the aberrations satisfactorily in the rear lens unit. If the lower limit of the condition (5) is not reached, the refractive power added to the rear lens unit becomes excessively strong in relation to the front lens unit. Although this is favorable for correction of various aberrations at the infinite object point, the fluctuation of aberrations increases when the system is focused at a near object point, as described above. Thus, it becomes difficult to obtain a high image magnification.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 graphically shows spherical aberration, astigmatism, lateral chromatic aberration, distortion, meridional and sagittal comatic aberrations at the infinite object point in Example 1.

FIG. 6 graphically shows spherical aberration, astigmatism, lateral chromatic aberration, distortion, meridional and sagittal comatic aberrations at the image magnification $\beta=-0.125$ in Example 1.

FIG. 8 graphically shows various aberrations in Example 2 in a similar manner to FIG. 6.

FIG. 9 graphically shows various aberrations in Example 3 in a similar manner to FIG. 5.

FIG. 10 graphically shows various aberrations in Example 3 in a similar manner to FIG. 6.

FIG. 11 graphically shows various aberrations in Example 4 in a similar manner to FIG. 5.

FIG. 12 graphically shows various aberrations in Example 4 in a similar manner to FIG. 6.

FIG. 13 graphically shows various aberrations in Example 5 in a similar manner to FIG. 5.

FIG. 14 graphically shows various aberrations in Example 5 in a similar manner to FIG. 6.

FIG. 15 graphically shows various aberrations in Example 6 in a similar manner to FIG. 5.

FIG. 16 graphically shows various aberrations in Example 6 in a similar manner to FIG. 6.

DESCRIPTION OF THE PREFERRED EMBODIMENTS

Examples 1 to 5 of the taking lens system according to the present invention will be described below.

Lens data in each Example will be described later. FIGS. 1, 2, 3 and 4 are sectional views respectively showing Examples 1, 4, 5 and 6 of the present invention. Since the lens arrangements of Examples 2 and 3 are approximately similar to the arrangement of Example 1, illustration thereof is omitted.

Figure 1:
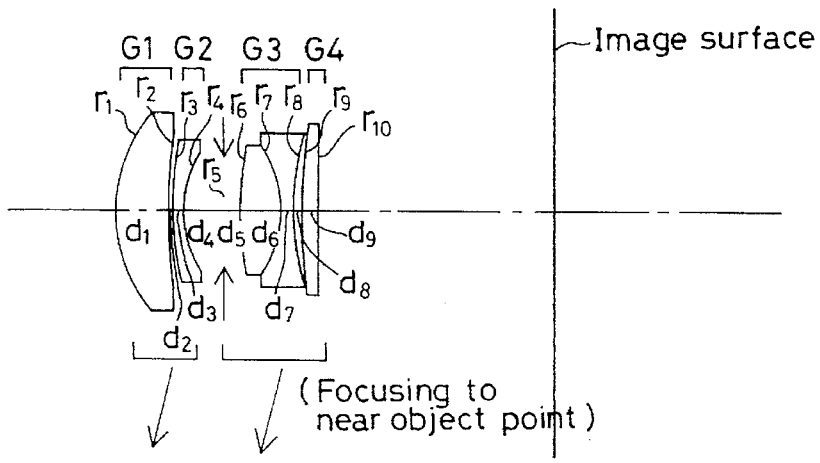
FIG. 1 is a sectional view showing Example 1 of the taking lens system according to the present invention.

Example 1 is a taking lens system having a focal length of 35 mm and an F-number of 2.87. It has 4 lens groups of 5 lens elements in total. As shown in FIG. 1, Example 1 includes, in order from the object side, a 1-st lens group G1 of a meniscus positive lens having a convex surface directed toward the object side, a 2-nd lens group G2 of a meniscus negative lens having a concave surface directed toward the image side, a 3-rd lens group G3 of a cemented meniscus positive lens consisting, in order from the object side, of a biconvex lens and a biconcave lens, and a 4-th lens group G4 of a biconvex positive lens. In addition, an aperture stop is disposed between the 2-nd and 3-rd lens groups G2 and G3. In Example 1, two aspherical surfaces are used: one for the object side surface of the 1-st lens group G1, and the other for the image-side surface of the 4th lens group G4. FIGS. 5 and 6 graphically show spherical aberration, astigmatism, lateral chromatic aberration, distortion, meridional and sagittal comatic aberrations at the infinite object point and at the image magnification $\beta=-0.125$ (nearest object point: 35.5 cm), respectively, in Example 1. As will be understood from these figures, the taking lens system has superior optical performance as far as the edges of image field, and even when the system is focused at a near object point, deterioration of the performance is extremely small.

Figures 7A, 7B, 7C, 7D:
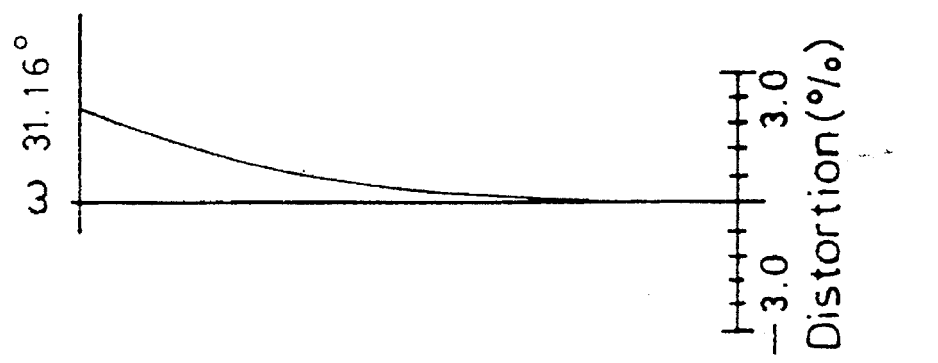
FIG. 7 graphically shows various aberrations in Example 2 in a similar manner to FIG. 5.

Example 2 is a taking lens system having a focal length of 35 mm and an F-number of 2.87. The lens arrangement is the same as that of Example 1 except that the 4-th lens group G4 is comprised of a meniscus positive lens having a convex surface directed toward the image side. In Example 2, two aspherical surfaces are used: one for the object-side surface of the 1-st lens group G1, and the other for the surface of the 3-rd lens group G3 that is the closest to the image side. FIGS. 7 and 8 graphically show various aberrations in Example 2 in a similar manner to FIGS. 5 and 6, respectively, which show various aberrations in Example 1. As will be understood from FIGS. 7 and 8, the taking lens system of this Example has superior optical performance as far as the edges of image field, and deterioration of the performance is extremely small even when the system is focused at a near object point.

Example 3 is a taking lens system having a focal length of 38.04 mm and an F-number of 2.87. The lens arrangement is similar to that of Example 1. In Example 3, two aspherical surfaces are used: one for the object-side surface of the 1-st lens group G1, and the other for the object-side surface of the 4-th lens group. FIGS. 9 and 10 graphically show various aberrations in Example 3 in a similar manner to FIGS. 5 and 6, respectively, which show various aberrations in Example 1. As will be understood from FIGS. 9 and 10, the taking lens system of this Example has superior optical performance as far as the edges of image field, and deterioration of the performance is extremely small even when the system is focused at a near object point.

Figure 2:
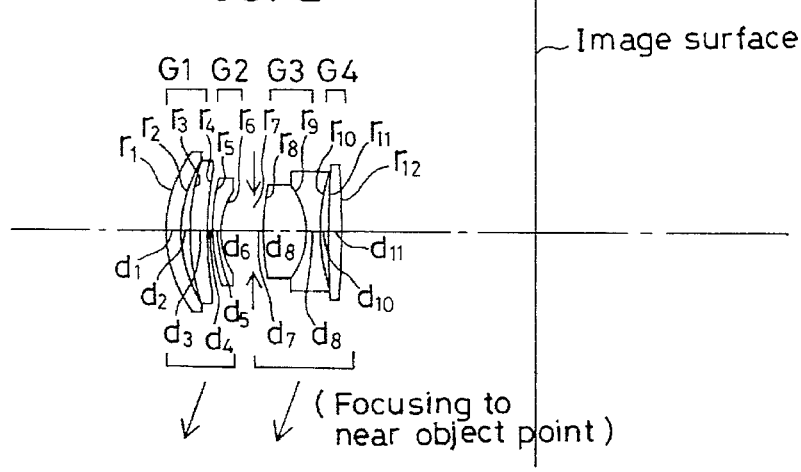
FIG. 2 is a sectional view showing Example 4 of the taking lens system according to the present invention.

Example 4 is a taking lens system having a focal length of 28.01 mm and an F-number of 3.55. As shown in FIG. 2, Example 4 has 5 lens groups of 6 lens elements in total. That is, the 1-st lens group G1 in Example 1 is divided into two subgroups, which are each comprised of a meniscus positive lens having a convex surface directed toward the object side. The 4-th lens group G4 consists of a biconvex lens. In Example 4, two aspherical surfaces are used: one for the surface of the 1-st lens group G1 that is the closest to the object side, and the other for the surface of the 3-rd lens group that is the closest to the image side. FIGS. 11 and 12 graphically show various aberrations in Example 4 in a similar manner to FIGS. 5 and 6, respectively, which show various aberrations in Example 1. As will be understood from FIGS. 11 and 12, the taking lens system of this Example has superior optical performance as far as the edges of image field, and deterioration of the performance is extremely small even when the system is focused at a near object point.

Figure 3:
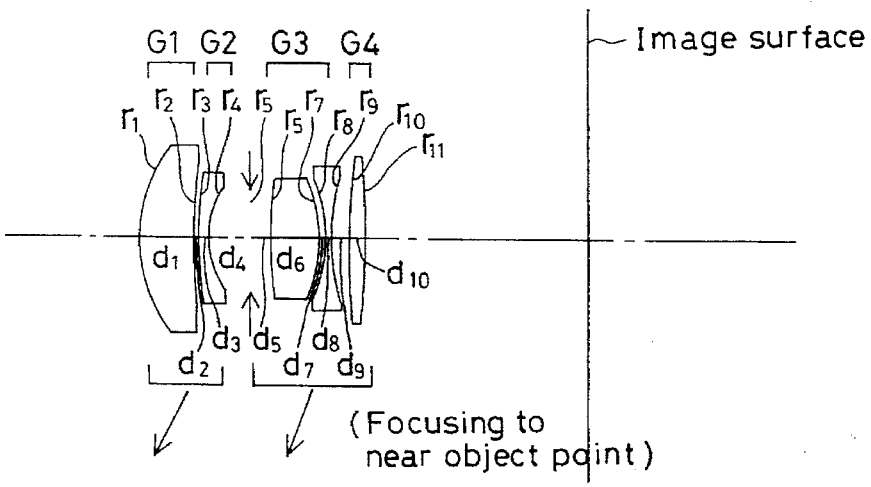
FIG. 3 is a sectional view showing Example 5 of the taking lens system according to the present invention.

Example 5 is a taking lens system having a focal length of 35.01 mm and an F-number of 2.88. As shown in FIG. 3, Example 5 has 5 lens groups of 5 lens elements in total. That is, the 3-rd lens group G3 in Example 1 is divided into two subgroups, which are respectively comprised of a biconvex lens and a biconcave lens. The 4-th lens group G4 consists of a biconvex lens. In Example 5, two aspherical surfaces are used: one for the object-side surface of the 1-st lens group G1, and the other for the surface of the 3-rd lens group that is the closest to the image side. FIGS. 13 and 14 graphically show various aberrations in Example 5 in a similar manner to FIGS. 5 and 6, respectively, which show various aberrations in Example 1. As will be understood from FIGS. 13 and 14, the taking lens system of this Example has superior optical performance as far as the edges of image field, and deterioration of the performance is extremely small even when the system is focused at a near object point.

Figure 4:
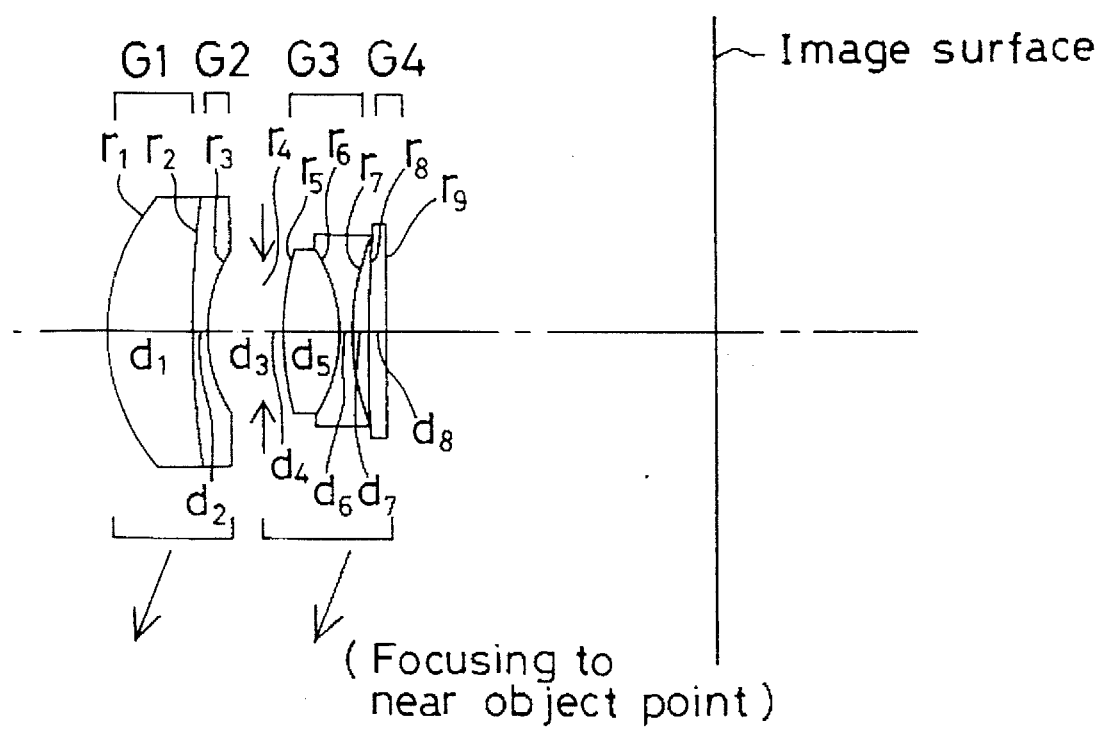
FIG. 4 is a sectional view showing Example 6 of the taking lens system according to the present invention.

Example 6 is a taking lens system having a focal length of 34.99 mm and an F-number of 2.86. As shown in FIG. 4, the lens arrangement is approximately similar to that of Example 1. However, in Example 6, the 1-st and 2-nd lens groups G1 and G2 are cemented together to form a lens arrangement having 3 lens groups of 5 lens elements in total. That is, Example 6 includes, in order from the object side, a 1-st lens group G1 of a meniscus positive lens having a convex surface directed toward the object side, a 2-nd lens group G2 of a meniscus negative lens having a concave surface directed toward the image side, a 3-rd lens group G3 of a cemented meniscus positive lens consisting of a biconvex lens and a biconcave lens, and a 4-th lens group G4 of a biconvex positive lens. In addition, an aperture stop is disposed between the 2-nd the 3-rd lens groups G2 and G3. By cementing together the 1-st and 2-nd lens groups G1 and G2, the number of air contact surfaces is reduced as a whole, thereby minimizing the influence of ghost or flare and also simplifying the lens frame configuration. Accordingly, the lens arrangement is suitable for manufacture. FIGS. 15 and 16 graphically show various aberrations in Example 6 in a similar manner to FIGS. 5 and 6, respectively, which show various aberrations in Example 1. As will be understood from FIGS. 15 and 16, the taking lens system of this Example has superior optical performance as far as the edges of image field, and deterioration of the performance is extremely small even when the system is focused at a near object point.

In any of these Examples, the aperture stop is disposed in front of the doublet, which constitutes the 3-rd lens group G3, and hence lies approximately in the center of the lens system. Accordingly, it becomes easy to ensure the brightness of the edge of image field. In addition, the overall length of the lens system is short ($\Sigma d < 23$ mm). Therefore, if the lens system is arranged to be collapsible when not used by the existing mechanical engineering, a high-performance and extremely small-sized compact camera can be put on the market.

Lens data in each Example will be shown below. In the following, reference symbol f denotes the focal length of the entire system, $F_{NO}$ is F-number, $\omega$ is the half view angle, $\Sigma d$ is the overall length of the lens system, $f_B$ is the back focus, $r_1, r_2 \ldots$ are the radii of curvature of lens surfaces, $d_1, d_2 \ldots$ are the spacings between adjacent lens surfaces, $n_{d1}, n_{d2} \ldots$ are the refractive indices of the lenses for the spectral d-line, and $v_{d1}, v_{d2} \ldots$ are the Abbe's numbers of the lenses. Assuming that the direction of the optical axis is x and a direction perpendicular to the optical axis is y, the aspherical configuration is expressed by $$x=(y^2/r)/\{1+(1-(y/r)^2)^{1/2}\}+A_4y^6+A_8y^8+A_{10}y^{10}$$

where r is the radius of curvature on the optical axis, and $A_4$, $A_6$, $A_8$, and $A_{10}$ are aspherical coefficients.

Example 1
f = 35.00, $F_{NO}$ = 2.87, ω = 31.31°,
Σd = 19.56, $f_B$ = 22.51

| | | | |
|---|---|---|---|
| $r_1$ = 14.0012 | $d_1$ = 5.213 | $n_{d1}$ = 1.81600 | $v_{d1}$ = 46.62 |
| (Aspheric) | | | |
| $r_2$ = 69.3900 | $d_2$ = 0.300 | | |
| $r_3$ = 43.5162 | $d_3$ = 1.000 | $n_{d2}$ = 1.68893 | $v_{d2}$ = 31.08 |
| $r_4$ = 9.2531 | $d_4$ = (Variable) | | |
| $r_5$ = ∞ (stop) | $d_5$ = 1.701 | | |
| $r_6$ = 33.8582 | $d_6$ = 4.157 | $n_{d3}$ = 1.77250 | $v_{d3}$ = 49.66 |
| $r_7$ = −9.6394 | $d_7$ = 0.900 | $n_{d4}$ = 1.53256 | $v_{d4}$ = 45.91 |
| $r_8$ = 22.7996 | $d_8$ = 0.883 | | |
| $r_9$ = 57.0686 | $d_9$ = 1.594 | $n_{d5}$ = 1.51633 | $v_{d5}$ = 64.15 |
| $r_{10}$ = −1634.9132 | | | |
| (Aspheric) | | | |

Aspherical Coefficients

1st surface $A_4 = -0.22197 \times 10^{-4}$
$A_6 = -0.24382 \times 10^{-6}$
$A_8 = 0.53145 \times 10^{-9}$
$A_{10} = -0.12650 \times 10^{-10}$ 10th surface $A_4 = 0.24976 \times 10^{-4}$
$A_6 = -0.19609 \times 10^{-6}$
$A_8 = 0.37291 \times 10^{-8}$
$A_{10} = 0.69329 \times 10^{-11}$

Focusing Space

| Object Point | ∞ | β = −0.125 (Nearest 35.5 cm) |
|---|---|---|
| $d_4$ | 3.815 | 4.073 |
| System Total Length | 42.072 | 46.710 |

The Third Order Aberration Coefficients

| Surface | Spherical | Coma | Astigmatism | Distortion |
|---|---|---|---|---|
| 1 | 0.07555 | −0.73653 | 0.24569 | −0.42440 |
| 2 | −0.04714 | 0.58277 | −0.80055 | 2.92015 |
| 3 | 0.02681 | −0.39527 | 0.64750 | −2.52782 |
| 4 | 0.13037 | 0.37299 | 0.11857 | 0.71013 |
| Stop | 0.00000 | 0.00000 | 0.00000 | 0.00000 |
| 6 | −0.00132 | −0.02830 | −0.06758 | −1.79378 |
| 7 | −0.22427 | 0.13631 | −0.00920 | 0.02823 |
| 8 | −0.00037 | −0.02105 | −0.13274 | 1.58393 |
| 9 | 0.00102 | −0.04065 | 0.18050 | −1.27570 |
| 10 | 0.01228 | 0.24506 | −0.16850 | 0.93235 |
| Total | −0.02707 | 0.06532 | 0.01369 | 0.15308 |

| Surface | Petzval's Error | Axial Chromatic | Magnificatin-Chromatic |
|---|---|---|---|
| 1 | −0.45577 | −0.01790 | −0.00517 |
| 2 | 0.09196 | −0.00761 | 0.03137 |
| 3 | −0.13312 | 0.00840 | −0.04127 |
| 4 | 0.62606 | 0.02196 | 0.02094 |
| Stop | 0.00000 | 0.00000 | 0.00000 |
| 6 | −0.18280 | −0.00336 | −0.02408 |
| 7 | −0.13013 | −0.00325 | 0.00066 |
| 8 | 0.21645 | 0.00111 | 0.02101 |
| 9 | −0.08474 | 0.00096 | −0.01284 |
| 10 | −0.00296 | −0.00254 | 0.01057 |
| Total | −0.05505 | −0.00223 | 0.00120 |

The Third Order Aberration Coefficients focused at the nearest object point (Photo-taking Magnificatin β = −0.125)

| Surface | Spherical | Coma | Astigmatism | Distortion |
|---|---|---|---|---|
| 1 | 0.04090 | −0.63889 | 0.18943 | −0.28063 |
| 2 | −0.03152 | 0.39125 | −0.53960 | 1.94329 |
| 3 | 0.01686 | −0.25622 | 0.43272 | −1.67960 |
| 4 | 0.15294 | 0.35175 | 0.08989 | 0.43388 |
| Stop | 0.00000 | 0.00000 | 0.00000 | 0.00000 |
| 6 | −0.00367 | −0.05612 | −0.09540 | −1.19547 |
| 7 | −0.22254 | 0.11819 | −0.00697 | 0.01875 |
| 8 | −0.00056 | −0.01761 | −0.06103 | 1.07646 |
| 9 | 0.00028 | −0.01670 | 0.10894 | −0.87101 |
| 10 | 0.02030 | 0.19702 | −0.11064 | 0.63990 |
| Total | −0.02701 | 0.07267 | 0.00733 | 0.08556 |

| Surface | Petzval's Error | Axial Chromatic | Magnificatin-Chromatic |
|---|---|---|---|
| 1 | −0.34656 | −0.01749 | −0.00368 |
| 2 | 0.06993 | −0.00651 | 0.02695 |
| 3 | −0.10123 | 0.00699 | −0.03544 |
| 4 | 0.47605 | 0.02224 | 0.01705 |
| Stop | 0.00000 | 0.00000 | 0.00000 |
| 6 | −0.13900 | −0.00415 | −0.02118 |
| 7 | −0.09895 | −0.00331 | 0.00059 |
| 8 | 0.16459 | 0.00181 | 0.01880 |
| 9 | −0.06443 | 0.00059 | −0.01155 |
| 10 | −0.00225 | −0.00232 | 0.00958 |
| Total | −0.04186 | −0.00215 | 0.00111 |

| $|(N_a - N_b)/R_c|$ = | 0.025 |
|---|---|
| $|f/f_4|$ = | 0.327 |
| $|R_N/f|$ = | 1.244 |
| $|f_{II}/f_I|$ = | 0.097 |
| $|f/f_I|$ = | 0.113 |

Example 2
f = 35.00, $F_{NO}$ = 2.87, ω = 31.16°,
Σd = 20.87, $f_B$ = 22.06

| | | | |
|---|---|---|---|
| $r_1$ = 14.2182 | $d_1$ = 5.260 | $n_{d1}$ = 1.80400 | $v_{d1}$ = 46.57 |
| (Aspheric) | | | |
| $r_2$ = 80.0679 | $d_2$ = 0.300 | | |
| $r_3$ = 43.8894 | $d_3$ = 1.190 | $n_{d2}$ = 1.68893 | $v_{d2}$ = 31.08 |
| $r_4$ = 9.1848 | $d_4$ = (Variable) | | |
| $r_5$ = ∞ (Stop) | $d_5$ = 1.555 | | |
| $r_6$ = 33.0689 | $d_6$ = 4.830 | $n_{d3}$ = 1.78650 | $v_{d3}$ = 50.00 |
| $r_7$ = −9.9105 | $d_7$ = 0.900 | $n_{d4}$ = 1.53256 | $v_{d4}$ = 45.91 |
| $r_8$ = 22.8017 | $d_8$ = 1.383 | | |
| (Aspheric) | | | |
| $r_9$ = −519.6565 | $d_9$ = 1.519 | $n_{d5}$ = 1.56907 | $v_{d5}$ = 71.30 |
| $r_{10}$ = −56.9966 | | | |

Aspherical Coefficients

1st surface $A_4 = -0.21805 \times 10^{-4}$
$A_6 = -0.21621 \times 10^{-6}$
$A_8 = 0.30216 \times 10^{-9}$
$A_{10} = -0.88095 \times 10^{-11}$ 8th surface $A_4 = 0.22188 \times 10^{-4}$
$A_6 = -0.29815 \times 10^{-6}$
$A_8 = 0.73196 \times 10^{-8}$
$A_{10} = -0.31674 \times 10^{-10}$

Focusing Space

| Object Point | ∞ | β = −0.125 (Nearest 35.5 cm) |
|---|---|---|
| $d_4$ | 3.932 | 4.174 |
| System Total Length | 42.927 | 47.554 |

| $|(N_a - N_b)/R_c|$ = | 0.026 |
|---|---|
| $|f/f_4|$ = | 0.312 |
| $|R_N/f|$ = | 1.254 |
| $|f_{II}/f_I|$ = | 0.080 |
| $|f/f_I|$ = | 0.095 |

5,636,067

-continued

Example 3
f = 38.04, F$_{NO}$ = 2.87, ω = 29.30°,
Σd = 22.32, f$_B$ = 23.93

| | | | |
|---|---|---|---|
| r$_1$ = 15.1755 (Aspheric) | d$_1$ = 5.832 | n$_{d1}$ = 1.81600 | ν$_{d1}$ = 46.62 |
| r$_2$ = 69.1339 | d$_2$ = 0.400 | | |
| r$_3$ = 36.0631 | d$_3$ = 1.165 | n$_{d2}$ = 1.69895 | ν$_{d2}$ = 30.12 |
| r$_4$ = 9.5797 | d$_4$ = (Variable) | | |
| r$_5$ = ∞ (Stop) | d$_5$ = 2.280 | | |
| r$_6$ = 38.4915 | d$_6$ = 4.539 | n$_{d3}$ = 1.77250 | ν$_{d3}$ = 49.66 |
| r$_7$ = −10.2794 | d$_7$ = 0.978 | n$_{d4}$ = 1.53256 | ν$_{d4}$ = 45.91 |
| r$_8$ = 24.9835 | d$_8$ = 1.034 | | |
| r$_9$ = 102.4825 (Aspheric) | d$_9$ = 1.587 | n$_{d5}$ = 1.56907 | ν$_{d5}$ = 71.30 |
| r$_{10}$ = −160.6628 | | | |

Aspherical Coefficients

1st surface $A_4 = -0.16268 \times 10^{-4}$
$A_6 = -0.15704 \times 10^{-6}$
$A_8 = 0.37071 \times 10^{-9}$
$A_{10} = -0.49536 \times 10^{-11}$ 9th surface $A_4 = -0.17724 \times 10^{-4}$
$A_6 = 0.90155 \times 10^{-7}$
$A_8 = -0.15695 \times 10^{-8}$
$A_{10} = -0.18280 \times 10^{-10}$

Focusing Space

| Object Point | ∞ | β = −0.125 (Nearest 35.5 cm) |
|---|---|---|
| d$_4$ | 4.500 | 4.781 |
| System Total Length | 46.247 | 51.287 |

| | |
|---|---|
| \| (N$_a$−N$_b$)/R$_c$ \| = | 0.023 |
| \| f/f$_4$ \| = | 0.345 |
| \| R$_N$/f \| = | 0.948 |
| \| f$_{II}$/f$_I$ \| = | 0.118 |
| \| f/f$_I$ \| = | 0.137 |

Example 4
f = 28.01, F$_{NO}$ = 3.55, ω = 37.12°,
Σd = 16.83, f$_B$ = 18.20

| | | | |
|---|---|---|---|
| r$_1$ = 11.1543 (Aspheric) | d$_1$ = 1.707 | n$_{d1}$ = 1.81600 | ν$_{d1}$ = 46.62 |
| r$_2$ = 13.9417 | d$_2$ = 0.399 | | |
| r$_3$ = 16.6384 | d$_3$ = 1.969 | n$_{d2}$ = 1.80400 | ν$_{d2}$ = 46.57 |
| r$_4$ = 50.1939 | d$_4$ = 0.398 | | |
| r$_5$ = 24.7971 | d$_5$ = 0.894 | n$_{d3}$ = 1.67270 | ν$_{d3}$ = 32.10 |
| r$_6$ = 7.5390 | d$_6$ = (Variable) | | |
| r$_7$ = ∞ (Stop) | d$_7$ = 0.999 | | |
| r$_8$ = 29.7771 | d$_8$ = 4.340 | n$_{d4}$ = 1.78650 | ν$_{d4}$ = 50.00 |
| r$_9$ = −7.3084 | d$_9$ = 1.266 | n$_{d5}$ = 1.53256 | ν$_{d5}$ = 45.91 |
| r$_{10}$ = 22.6143 | d$_{10}$ = 0.703 | | |
| r$_{11}$ = 133.1529 (Aspheric) | d$_{11}$ = 1.228 | n$_{d6}$ = 1.56907 | ν$_{d6}$ = 71.30 |
| r$_{12}$ = −244.9912 | | | |

Aspherical Coefficients

1st surface $A_4 = -0.44885 \times 10^{-4}$
$A_6 = -0.96042 \times 10^{-6}$
$A_8 = 0.46523 \times 10^{-8}$
$A_{10} = -0.94267 \times 10^{-10}$ 10th surface $A_4 = 0.80998 \times 10^{-4}$
$A_6 = -0.17389 \times 10^{-5}$
$A_8 = 0.56148 \times 10^{-7}$
$A_{10} = -0.50784 \times 10^{-9}$ -continued

Focusing Space

| Object Point | ∞ | β = −0.125(Nearest 35.5 cm) |
|---|---|---|
| d$_6$ | 2.923 | 3.085 |
| System Total Length | 35.030 | 38.703 |

| | |
|---|---|
| \| (N$_a$−N$_b$)/R$_c$ \| = | 0.035 |
| \| f/f$_4$ \| = | 0.185 |
| \| R$_N$/f \| = | 0.885 |
| \| f$_{II}$/f$_I$ \| = | 0.027 |
| \| f/f$_I$ \| = | 0.033 |

Example 5
f = 35.01, F$_{NO}$ = 2.88, ω = 31.27°,
Σd = 21.56, f$_B$ = 20.72

| | | | |
|---|---|---|---|
| r$_1$ = 13.7180 (Aspheric) | d$_1$ = 5.248 | n$_{d1}$ = 1.80400 | ν$_{d1}$ = 46.57 |
| r$_2$ = 115.0867 | d$_2$ = 0.299 | | |
| r$_3$ = 61.7340 | d$_3$ = 1.169 | n$_{d2}$ = 1.68893 | ν$_{d2}$ = 31.08 |
| r$_4$ = 9.1649 | d$_4$ = (Variable) | | |
| r$_5$ = ∞ (Stop) | d$_5$ = 1.731 | | |
| r$_6$ = 33.5681 | d$_6$ = 5.005 | n$_{d3}$ = 1.77250 | ν$_{d3}$ = 49.66 |
| r$_7$ = −13.1356 | d$_7$ = 0.297 | | |
| r$_8$ = −14.4832 | d$_8$ = 0.900 | n$_{d4}$ = 1.53256 | ν$_{d4}$ = 45.91 |
| r$_9$ = 22.0822 (Aspheric) | d$_9$ = 1.326 | | |
| r$_{10}$ = 63.0683 | d$_{10}$ = 1.651 | n$_{d5}$ = 1.56907 | ν$_{d5}$ = 71.30 |
| r$_{11}$ = −212.3887 | | | |

Aspherical Coefficients

1st surface $A_4 = -0.22914 \times 10^{-4}$
$A_6 = -0.23788 \times 10^{-6}$
$A_8 = 0.51369 \times 10^{-10}$
$A_{10} = -0.10904 \times 10^{-10}$ 9th surface $A_4 = 0.99727 \times 10^{-5}$
$A_6 = -0.13171 \times 10^{-6}$
$A_8 = 0.21854 \times 10^{-8}$
$A_{10} = 0.62625 \times 10^{-12}$

Focusing Space

| Object Point | ∞ | β = −0.125 (Nearest 35.5 cm) |
|---|---|---|
| d$_4$ | 3.932 | 4.205 |
| System Total | 42.279 | 46.939 |

| | |
|---|---|
| \| f/f$_4$ \| = | 0.409 |
| \| R$_N$/f \| = | 1.764 |
| \| f$_{II}$/f$_I$ \| = | 0.120 |
| \| f/f$_I$ \| = | 0.138 |

Example 6
f = 34.99, F$_{NO}$ = 2.86, ω = 31.35°,
Σd = 19.40, f$_B$ = 22.72

| | | | |
|---|---|---|---|
| r$_1$ = 13.6671 (Aspheric) | d$_1$ = 5.824 | n$_{d1}$ = 1.74330 | ν$_{d1}$ = 49.33 |
| r$_2$ = 67.7778 | d$_2$ = 1.001 | n$_{d2}$ = 1.64769 | ν$_{d2}$ = 33.80 |
| r$_3$ = 9.7893 | d$_3$ = (Variable) | | |
| r$_4$ = ∞ (Stop) | d$_4$ = 1.800 | | |
| r$_5$ = 23.6675 | d$_5$ = 3.931 | n$_{d3}$ = 1.78800 | ν$_{d3}$ = 47.38 |
| r$_6$ = −10.7243 | d$_6$ = 0.900 | n$_{d4}$ = 1.56732 | ν$_{d4}$ = 42.84 |
| r$_7$ = 19.3964 | d$_7$ = 0.941 | | |
| r$_8$ = 72.2365 | d$_8$ = 1.495 | n$_{d5}$ = 1.56384 | ν$_{d5}$ = 60.69 |
| r$_9$ = −219.9894 (Aspheric) | | | |

Aspherical Coefficients

1st surface $A_4 = -0.18652 \times 10^{-4}$
$A_6 = -0.21199 \times 10^{-6}$

-continued $A_8 = 0.46586 \times 10^{-9}$
$A_{10} = -0.15993 \times 10^{-10}$

9th surface $A_4 = 0.42343 \times 10^{-4}$
$A_6 = -0.75704 \times 10^{-6}$
$A_8 = 0.18309 \times 10^{-7}$
$A_{10} = -0.71320 \times 10^{-10}$

| | Focusing Space | |
|---|---|---|
| Object Point | ∞ | β = −0.125(Nearest 35.5 cm) |
| $d_3$ | 3.512 | 3.891 |
| System Total Length | 42.129 | 46.889 |
| $\mid f/f_4 \mid =$ | | 0.362 |
| $\mid R_N/f \mid =$ | | 1.937 |
| $\mid f_{II}/f_I \mid =$ | | 0.035 |
| $\mid f/f_I \mid =$ | | 0.043 |

Figure 17:
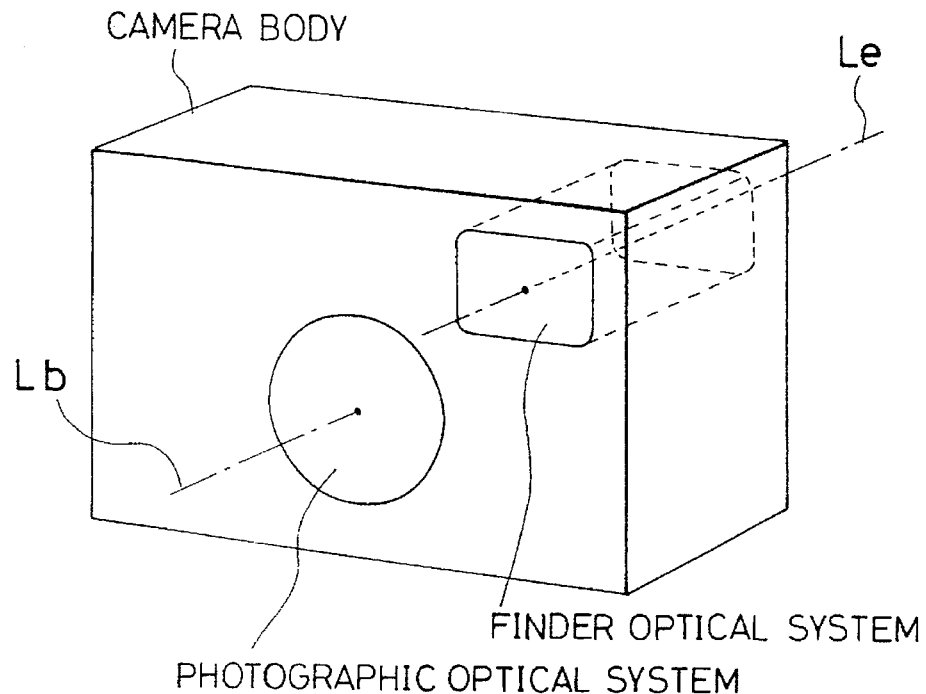
FIG. 17 shows a camera employing the taking lens system of the present invention as a photographic objective in a perspective view (a) and a sectional view (b).
Figure 17:
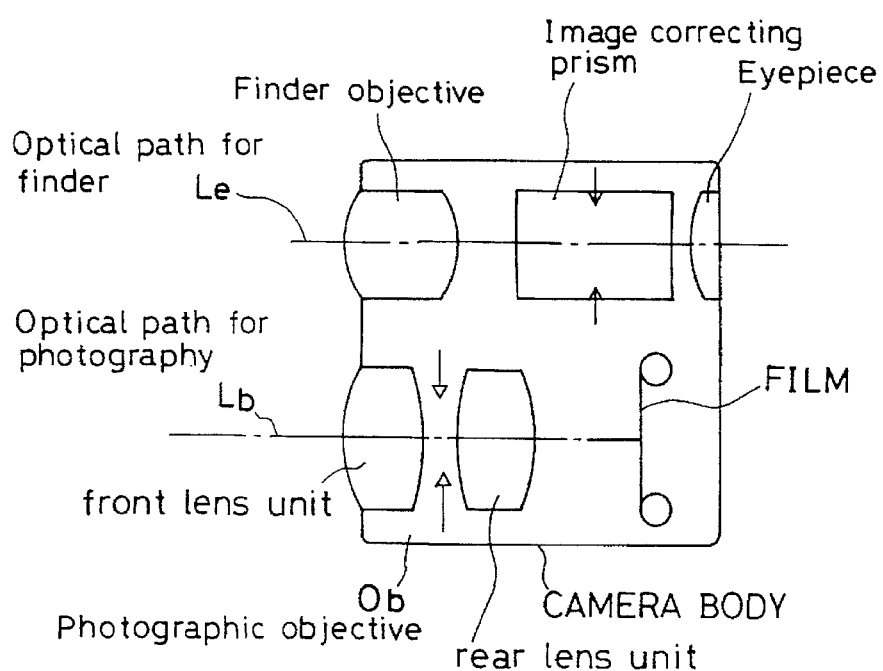

The taking lens system of the present invention as described in the foregoing Examples may be employed, for example, as a photographic objective Ob of a camera which is provided with a photographic optical system separately from a finder optical system as shown in a perspective view at (a) in FIG. 17 and in a sectional view at (b) in the figure. It should be noted that in FIG. 17 Le denotes an optical path for finder, and Lb an optical path for photography.

As will be clear from the foregoing description, the present invention makes it possible to realize a novel, high-performance taking lens system by appropriately arranging the configuration of the 3-rd and 2-nd lens groups and so forth. In addition, since the floating system is adopted for focusing to a near object point, the performance at a near object point becomes considerably stable, and it is also possible to shorten the closest focusing distance.

What we claim is:

1. A two-unit taking lens system comprising a front lens unit on an object side thereof and a rear lens unit on an image side thereof with a stop located therebetween, wherein:

said front lens unit includes at least one positive lens and at least one negative lens whose image-side surface has a curvature stronger than that of an object-side surface thereof, said negative lens in said front lens unit being located nearest to the image-side of said front lens unit, said rear lens unit includes a cemented doublet which consists of one positive lens and one negative lens and which has a positive refractive power as a whole, and a positive lens, a lens surface of said cemented doublet nearest to the image side is concave on the image side, and an intermediate lens surface of said doublet is convex on the image side.

2. A taking lens system of two-unit construction consisting of:

a front lens unit including at least one positive lens and at least one negative lens whose image-side surface has a stronger curvature than that of an object-side surface thereof, a rear lens unit including a doublet which consists of a positive lens and a negative lens and which has a positive refractive power as a whole, and a positive lens, and a stop is located on the image side with respect to said front lens unit, wherein focusing from an infinite object point to a near object point is effected by varying the spacing between said front and rear lens units.

3. A taking lens system according to claim 2, wherein focusing from an infinite object point to a near object point is effected by varying the spacing between said front lens unit and said aperture stop.

4. A taking lens system according to claim 2, wherein focusing from an infinite object point to a near object point is effected by moving said front lens unit toward the object side while moving said aperture stop and said rear lens unit together as one unit toward the object side.

5. A taking lens system comprising a front lens unit including at least one positive lens and at least one negative lens, and a rear lens unit including a doublet which consists of a positive lens and a negative lens, and a positive lens provided on the image side of said doublet, wherein focusing from an infinite object point to a near object point is effected by individually moving said front and rear lens units toward the object side while varying the spacing therebetween.

6. A taking lens system comprising a front lens unit including at least one positive lens and at least one negative lens whose image-side surface has a stronger curvature than that of an object-side surface thereof, wherein said negative lens which is located in said front lens unit and whose image-side has a curvature stronger than that of the object-side surface thereof is located nearest to the image side of said front lens unit, and a rear lens unit including a cemented doublet which consists of a positive lens and a negative lens and which has a positive refractive power as a whole, and a positive lens, wherein a lens surface of said cemented doublet that is the closest to the image side is concave toward the image side, and focusing from an infinite object point to a near object point is effected by varying the spacing between said front and rear lens units.

7. A taking lens system comprising a front lens unit including at least one positive lens and at least one negative lens whose image-side surface has a stronger curvature than that of an object-side surface thereof, wherein said negative lens which is located in said front lens unit and whose image-side has a curvature stronger than that of the object-side surface thereof is located nearest to the image side of said front lens unit, and a rear lens unit including a cemented doublet which consists of a positive lens and a negative lens and which has a positive refractive power as a whole, and a positive lens, wherein a lens surface of said cemented doublet that is the closest to the image side is concave toward the image side, and respective surfaces of said positive and negative lenses of said doublet facing each other are both convex toward the image side, and wherein focusing from an infinite object point to a near object point is effected by varying the spacing between said front and rear lens units.

8. A taking lens system according to claim 5 or 7, wherein said positive and negative lenses of said doublet are cemented together.

9. A taking lens system according to claim 5 or 7, wherein said front lens unit is a cemented lens.

10. A taking lens system of two-unit construction consisting essentially of:

a front lens unit including at least one positive lens and at least one negative lens whose image-side surface has a stronger curvature than that of an object-side surface thereof, wherein said negative lens which is located in said front lens unit and whose image-side has a curvature stronger than that of the object-side surface thereof is located nearest to the image-side of said front lens unit, and a rear lens unit including a doublet which consists of a positive lens and a negative lens and which has a positive refractive power as a whole, and a positive lens, wherein focusing from an infinite object point to a near object point is effected by varying the spacing between said front and rear lens units.

11. A taking lens system of two-unit construction consisting essentially of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, wherein during focusing said front lens unit and said rear lens unit move on the optical axis while a spacing therebetween varies.

12. A single focal type of taking lens system of two unit construction consisting essentially of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units.

13. A taking lens system according to claim 1, 2, 5, 6, 7, 10, 11, or 12, wherein at least one negative lens of said front lens unit has a meniscus configuration with a concave surface directed toward the image side.

14. A taking lens system according to claim 1, 2, 5, 6, 7, 10, 11, or 12, wherein a lens surface of said doublet that is the closest to the object side is convex toward the object side.

15. A taking lens system according to claim 1, 2, 5, 6, 7, 10, 11, or 12, wherein the absolute value of refractive power of a lens surface of said doublet that is the closest to the image side is larger than that of a lens surface of said doublet that is the closest to the object side.

16. A taking lens system according to claim 1, 2, 5, 6, 7, 10, 11, or 12, which satisfies the following condition (1):

(1) $0.4f<|R_N|$ where $R_N$ is the radius of curvature of the object-side lens surface of the negative lens in said front lens unit, and f is the focal length of the entire lens system.

17. A taking lens system according to claim 1, 2, 5, 6, 7, 10, 11, or 12, which satisfies the following condition (2):

(2) $0<f/f_4<0.85$ where $f_4$ is the focal length of the positive lens group behind said doublet, and f is the focal length of the entire lens system.

18. A taking lens system according to claim 1, 2, 5, 6, 7, 10, 11, or 12, which satisfies the following condition (3):

(3) $0.3f<|(N_a-N_b)R_c|<1.5f$ where $N_a$ is the refractive index of the positive lens of said doublet, $N_b$ is the refractive index of the negative lens of said doublet, $R_c$ is the radius of curvature of the cemented surface of said doublet, and f is the focal length of the entire system.

19. A taking lens system according to claim 1, 2, 5, 7, 10, 11, or 12, which satisfies the following condition (4):

(4) $0.01<|(f_{II}/f_I)|<0.25$ where $f_I$ and $f_{II}$ are the focal lengths of said front and rear lens units, respectively.

20. A taking lens system according to claim 1, 2, 5, 6, 7, 10, 11, or 12 which satisfies the following condition (5):

(5) $0.01<|(f/f_I)|<0.30$ where $f_I$ is the focal length of said front lens unit, and f is the focal length of the entire lens system.

21. A taking lens systems of two-unit construction consisting essentially of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens unit, wherein said front lens unit is a cemented lens.

22. A taking lens system comprising:

a front lens unit including at least one positive lens and at least one negative lens whose image-side surface has a stronger curvature than that of an object-side surface thereof, and a rear lens unit disposed behind said front lens unit and including a cemented doublet which consists of one positive lens and one negative lens and which has a positive refractive power as a whole, and a positive lens, wherein a lens surface of said cemented doublet that is the closest to the image side is concave toward the image side, and an intermediate lens surface of said doublet is convex toward the image side, which satisfies the following condition (1):

(1) $0.4f<|R_N|$ wherein $R_N$ is the radius of curvature of the object-side lens surface of the negative lens in said front lens unit, and is the focal length of the entire lens system.

23. A taking lens system comprising:

a front lens unit including at least one positive lens and at least one negative lens whose image-side surface has a stronger curvature than that of an object-side surface thereof, and a rear lens unit disposed behind said front lens unit and including a cemented doublet which consists of one positive lens and one negative lens and which has a positive refractive power as a whole, and a positive lens, wherein a lens surface of said cemented doublet that is the closest to the image side is concave toward the image side, and an intermediate lens surface of said doublet is convex toward the image side, which satisfies the following condition (2):

(2) $0<f/f_4<0.85$ wherein $f_4$ is the focal length of the positive lens group behind said doublet, and f is the focal length of the entire lens system.

24. A taking lens system comprising:

a front lens unit including at least one positive lens and at least one negative lens whose image-side surface has a stronger curvature than that of an object-side surface thereof, and a rear lens unit disposed behind said front lens unit and including a cemented doublet which consists of one positive lens and one negative lens and which has a positive refractive power as a whole, and a positive lens, wherein a lens surface of said cemented doublet that is the closest to the image side is concave toward the image side, and an intermediate lens surface of said doublet is convex toward the image side, which satisfies the following condition (3):

(3) $0.3f<|(N_a-N_b)/R_c|<1.5/f$ wherein $N_a$ is the refractive index of the positive lens of said doublet, $N_b$ is the refractive index of the negative lens of said doublet, $R_c$ is the radius of curvature of the cemented surface of said doublet, and f is the focal length of the entire lens system.

25. A taking lens system according to comprising:

a front lens unit including at least one positive lens and at least one negative lens whose image-side surface has a stronger curvature than that of an object-side surface thereof, and a rear lens unit disposed behind said front lens unit and including a cemented doublet which consists of one positive lens and one negative lens and which has a positive refractive power as a whole, and a positive lens, wherein a lens surface of said cemented doublet that is the closest to the image side of concave toward the image side, and an intermediate lens surface of said doublet is convex toward the image side, which satisfies the following condition (4):

(4) $0.01<|(f_I/f_{II})|<0.25$ where $f_I$ and $f_{II}$ are the focal lengths of said front and rear lens units, respectively.

26. A taking lens system comprising:

a front lens unit including at least one positive lens and at least one negative lens whose image-side surface has a stronger curvature than that of an object-side surface thereof, and a rear lens unit disposed behind said front lens unit and including a cemented doublet which consists of one positive lens and one negative lens and which has a positive refractive power as a whole, and a positive lens, wherein a lens surface of said cemented doublet that is the closest to the image side is concave toward the image side, and an intermediate lens surface of said doublet is convex toward the image side, which satisfies the following condition (5):

(5) $0.01<|(f_f/f)|<0.30$ where $f_f$ is the local length of said front lens unit, and f is the focal length of the entire lens system.

27. A taking lens system of two-unit construction consisting of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, which satisfies the following condition (1):

(1) $0.4f<|R_N|$ wherein $R_N$ is the radius of curvature of the object-side lens surface of the negative lens in said front lens unit, and f is the focal length of the entire lens system.

28. A taking lens system of two-unit construction consisting of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, which satisfies the following condition (2):

(2) $0<f/f_4<0.85$ wherein $f_4$ is the focal length of the positive lens group behind said doublet, and f is the focal length of the entire lens system.

29. A taking lens system of two-unit construction consisting of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, which satisfies the following condition (3):

(3) $0.3f < |(N_a - N_b)/R_c| < 1.5/f$ wherein $N_a$ is the refractive index of the positive lens of said doublet, $N_b$ is the refractive index of the negative lens of said doublet, $R_c$ is the radius of curvature of the cemented surface of said doublet, and f is the focal length of the entire lens system.

30. A taking lens system of two-unit construction consisting of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, which satisfies the following condition (4):

(4) $0.01 < |(f_{II}/f)| < 0.25$ where $f_I$ and $f_{II}$ are the focal lengths of said front and rear lens units, respectively.

31. A taking lens system of two-unit construction consisting of:

a front lens unit including at least one positive lens and at least one negative lens whose image-side surface has a stronger curvature than that of an object-side surface thereof, and a rear lens unit including a doublet which consists of a positive lens and a negative lens and which has a positive refractive power as a whole, and a positive lens, wherein focusing from an infinite object point to a near object point is effected by varying the spacing between said front and rear lens units, which satisfies the following condition (5):

(5) $0.01 < |(f/f_I)| < 0.30$ where $f_I$ is the local length of said front lens unit, and f is the focal length of the entire lens system.

* * * * *